United States Patent
Cho et al.

(10) Patent No.: US 9,127,639 B2
(45) Date of Patent: Sep. 8, 2015

(54) SYSTEM AND METHOD FOR WATER EXPULSION FROM UNDERWATER HYDROPOWER PLANT AND HYDROPOWER PLANT ASSOCIATED THEREWITH

(76) Inventors: Michael Y. Cho, Benbrook, TX (US);
John M. Cho, Columbia, MD (US)

( * ) Notice: Subject to any disclaimer, the term of this patent is extended or adjusted under 35 U.S.C. 154(b) by 1129 days.

(21) Appl. No.: 12/938,082

(22) Filed: Nov. 2, 2010

(65) Prior Publication Data
US 2011/0110797 A1   May 12, 2011

Related U.S. Application Data

(60) Provisional application No. 61/257,259, filed on Nov. 2, 2009.

(51) Int. Cl.
F03B 17/06 (2006.01)
F03B 13/10 (2006.01)

(52) U.S. Cl.
CPC .............. *F03B 17/06* (2013.01); *F03B 13/10* (2013.01); *Y02E 10/22* (2013.01); *Y02E 10/28* (2013.01); *Y10T 137/0396* (2015.04)

(58) Field of Classification Search
CPC ........ F03B 13/06; F03B 13/08; F03B 13/086; Y02E 10/20; Y02E 10/22; F05B 2240/97; F05B 2260/601
USPC .............. 290/42, 52, 53, 54; 417/313; 60/398
See application file for complete search history.

(56) References Cited

U.S. PATENT DOCUMENTS

| | | | |
|---|---|---|---|
| 3,670,680 A | 6/1972 | Kriedt | |
| 3,841,797 A | 10/1974 | Fitzgerald | |
| 3,965,675 A | 6/1976 | Martz et al. | |
| 3,967,449 A | 7/1976 | Beck | |
| 4,095,421 A | 6/1978 | Silcox | |
| 4,163,905 A | 8/1979 | Davison | |
| 4,424,681 A | 1/1984 | Rice et al. | |
| 4,430,861 A | 2/1984 | Avery | |
| 4,619,593 A | 10/1986 | Molnar | |
| 4,807,437 A | 2/1989 | Pelin | |
| 4,991,397 A | 2/1991 | Varsa | |
| 5,421,310 A | 6/1995 | Kapich | |
| 6,202,417 B1 | 3/2001 | Beck | |

(Continued)

FOREIGN PATENT DOCUMENTS

| WO | 82/00495 A1 | 2/1982 |
|---|---|---|
| WO | 95/25220 A1 | 9/1995 |
| WO | 2004064221 A2 | 7/2004 |

OTHER PUBLICATIONS

Munsen et al.; "Fundamentals of Fluid Mechanics"; 3rd Edition, p. 131; John Wiley, 1998.

(Continued)

*Primary Examiner* — Devon Kramer
*Assistant Examiner* — Patrick Hamo
(74) *Attorney, Agent, or Firm* — Studebaker & Brackett PC

(57) ABSTRACT

Systems and methods relate to utilizing fluid potential energy to produce large scale and sustainable hydroelectric power by employing a Cho-Venturi hydraulic ram (CVHR). The CVHR system includes a Cho-Venturi tube (CVT) in which a primary flow from a fluid at a head pressure at a depth in a body of the fluid combines with a recirculation flow in a throat section of the CVT. A pressure higher than the pressure outside the plant is generated at the end of a diverging section the CVT, which enables expulsion of the fluid discharged from hydraulic turbines under atmospheric pressure to the fluid depth while another portion of the fluid is recycled for power generation.

42 Claims, 26 Drawing Sheets

(56) References Cited

U.S. PATENT DOCUMENTS

| | | | |
|---|---|---|---|
| 6,250,324 | B1 | 6/2001 | Conrad et al. |
| 6,546,723 | B1 | 4/2003 | Watten et al. |
| 6,666,024 | B1 | 12/2003 | Moskal |
| 7,132,758 | B2 * | 11/2006 | Rochester et al. ............... 60/398 |
| 7,150,149 | B2 * | 12/2006 | Rochester et al. ............... 60/398 |
| 7,188,471 | B2 | 3/2007 | Walters |
| 2008/0277263 | A1 | 11/2008 | Swenholt |

OTHER PUBLICATIONS

Frank M. White; "Fluid Mechanics"; 5th Edition; McGraw-Hill, pp. 421-422, 2003.

Howard S. Bean; "Their Theory and Application"; 6th Edition; pp. 230-232; 1971, ASME.

Robert L. Dougherty; "Fluid Mechanics With Engineering Application"; 8th Edition McGraw-Hill; pp. 419-421;1985.

OFFSHORE-TECHNOLOGY.COM; http://www.offshore-technology.com/projects/hibernia/hibernia3.html; SPG Media Limited; Copyright 2007.

http://statoil.no/STATOILCOM/SVG00990.NSF/Attachments/Troll/$FILE/Troll__illustrasjon.jpg; May 15, 2008.

Notification of Transmittal of the International Search Report and The Written Opinion of the International Searching Authority, or the Declaration with mailing date of Jun. 1, 2011; International Application No. PCT/US2010/055126.

* cited by examiner

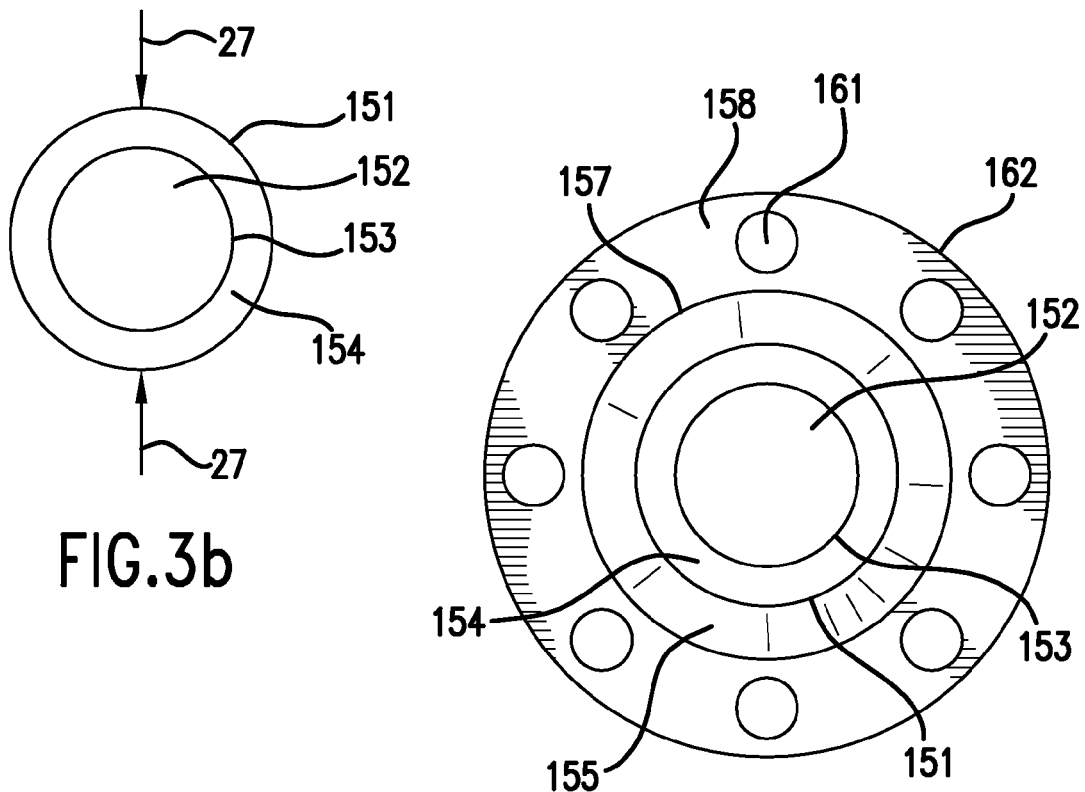
FIG.3b
FIG.3c
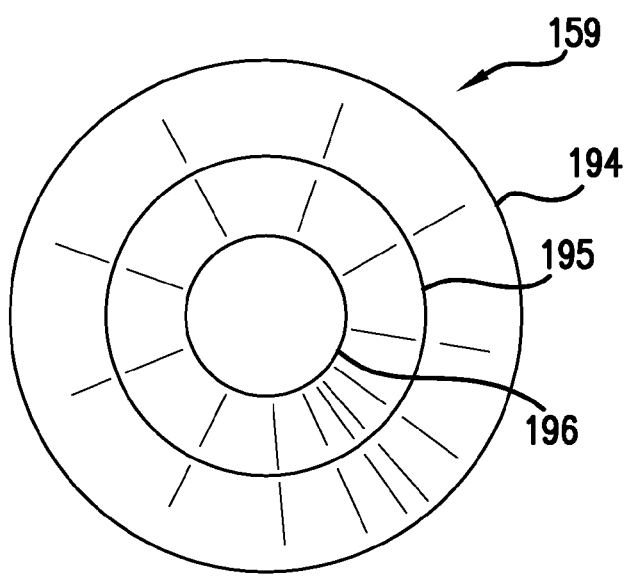
FIG.3d

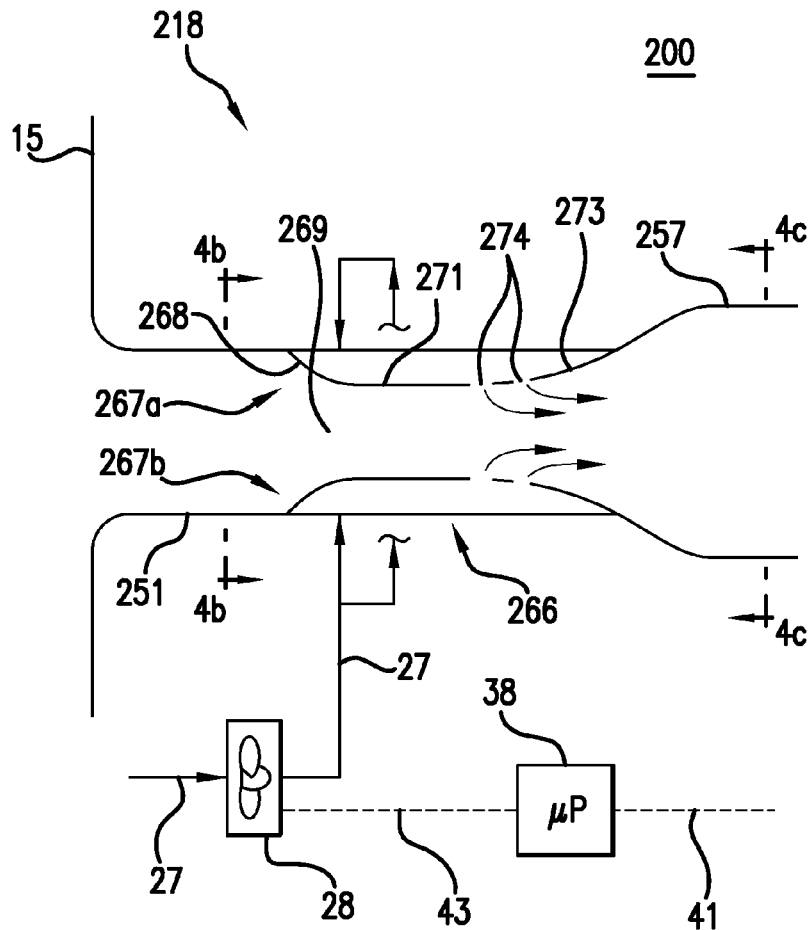
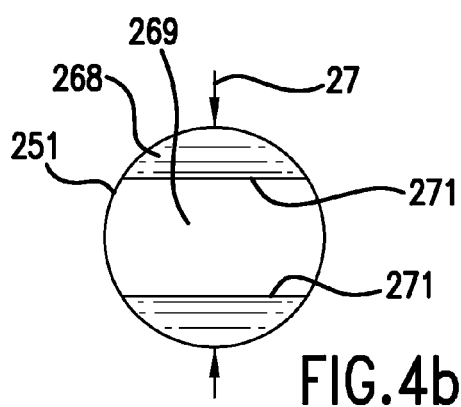
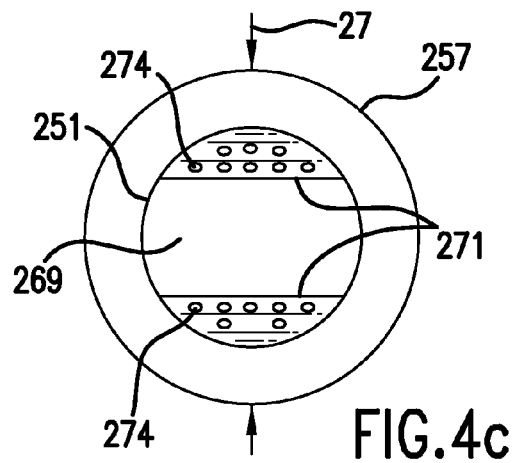

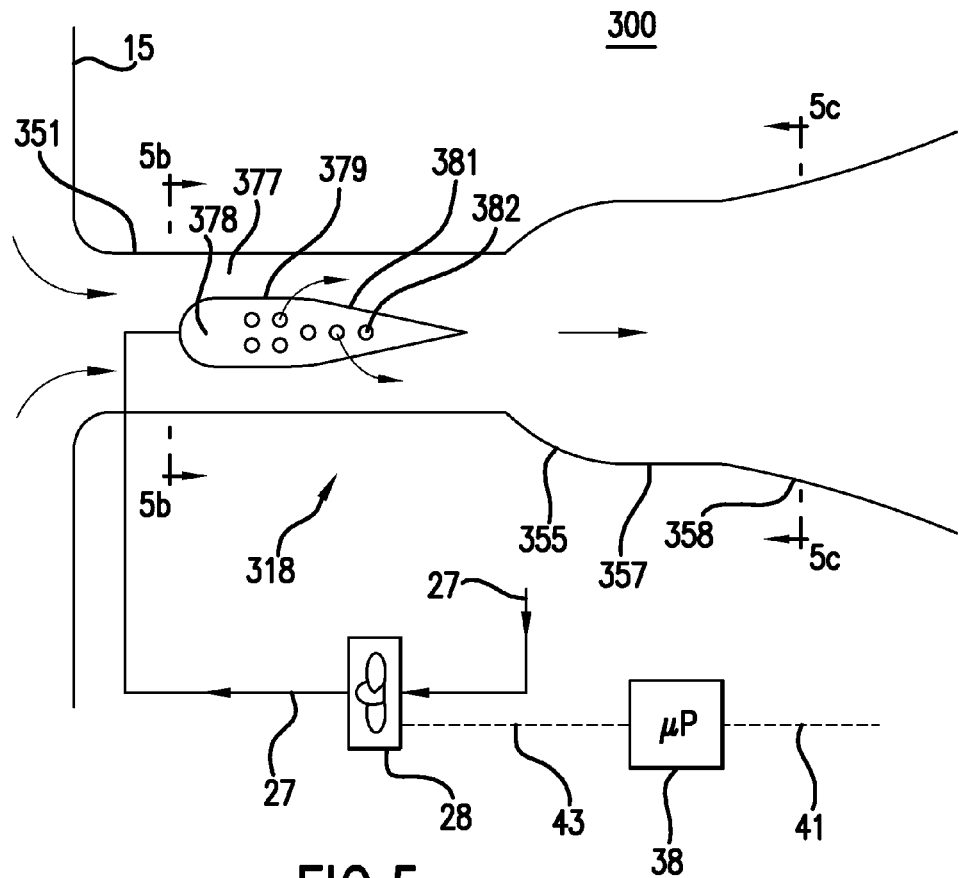
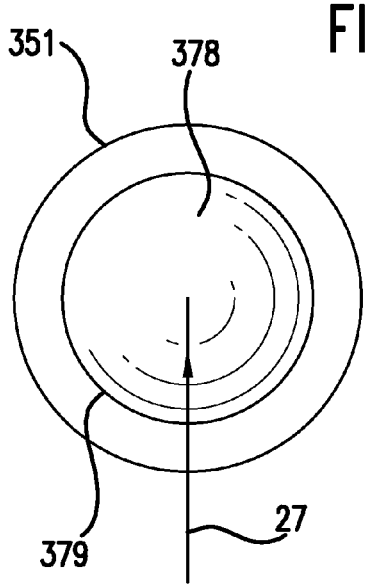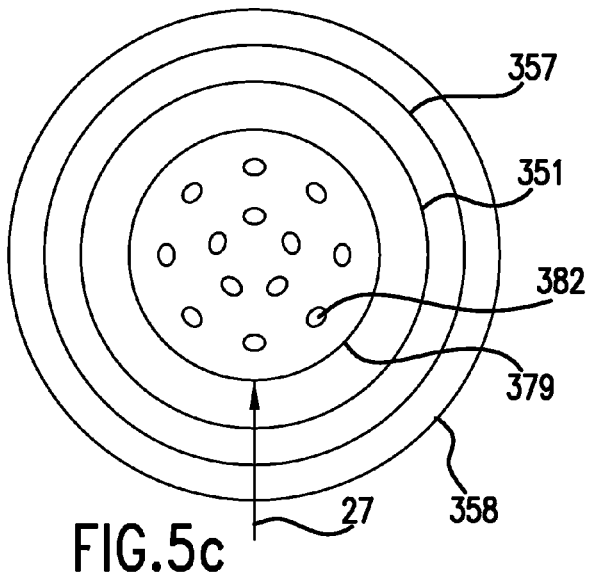
FIG.5a
FIG.5b          FIG.5c

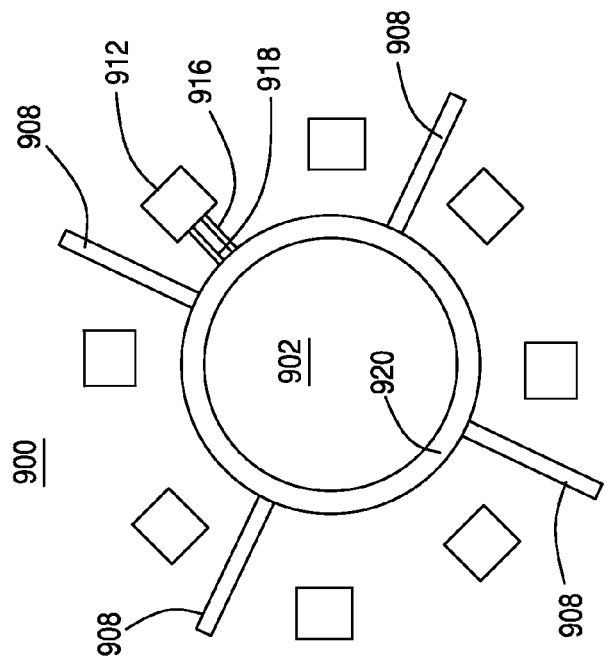
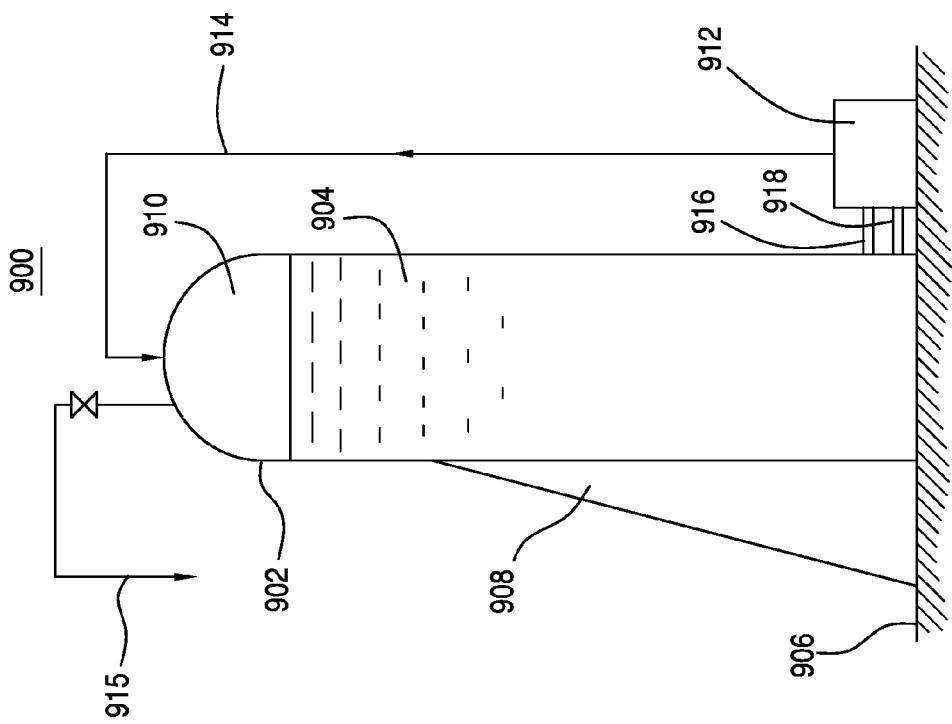
FIG.12b
FIG.12a

SYSTEM AND METHOD FOR WATER EXPULSION FROM UNDERWATER HYDROPOWER PLANT AND HYDROPOWER PLANT ASSOCIATED THEREWITH

FIELD OF THE INVENTION

The present invention generally relates to the conversion of underwater potential energy to hydroelectric power and expulsion of the water discharged from hydraulic turbines.

BACKGROUND

Underwater potential energy is a renewable energy that is available almost everywhere on earth. About 71 percent of the surface of the earth is covered with the various oceans, lakes and rivers with sufficient depths to provide underwater potential energy for power generation. Moreover, some of the world's most populous areas are located along a coast. In the United States, for example, twenty-three of the twenty-five most densely populated counties are in coastal regions. Although coastal counties constitute only 17 percent of the total land area of the United States (not including Alaska), these coastal counties account for 53 percent of the total population. In such highly populated areas, increased energy consumption is necessary to sustain further population and economic growth. Needless to say, these areas of the globe would benefit from generating power from this renewable potential energy source.

In addition, finding a continuous supply of fossil fuels is becoming more uncertain and unpredictable. These trends can lead to increasing negative effect on commerce and quality of life. For instance, the commercial maritime transportation industry is totally dependent on petroleum derived fuels. Operating costs, as well as transportation costs increase with greater scarcity and less reliable sources of energy. Disruptions in service could lead to damaging, if not disastrous effects on local and global economies. Accordingly, finding alternative energy for maritime use is an emerging need.

While underwater potential energy of oceans and other bodies of water offers a promising energy source for consumption, especially in areas proximal to shorelines, efficient methods are not presently available to convert this immense potential energy source to hydroelectric power in a truly economical and sustainable fashion. Thus, a more efficient and effective system and method of harnessing underwater potential energy is desirable.

SUMMARY

The inventions are directed to a system and method for utilizing fluid potential energy to produce large scale and sustainable hydroelectric power in a hydropower plant by employing a Cho-Venturi tube (CVT) in which a primary flow from a fluid at a head pressure at a depth in a body of the fluid combines with a recirculation flow in a throat section of the CVT. A pressure of the working fluid is generated at the end of a diverging section the CVT that is higher than the pressure of the body of fluid at the depth, which enables expulsion of the fluid discharged from an energy conversion device to the fluid depth while another portion of the fluid is recycled for power generation.

In an embodiment consistent with a claimed invention, a water expulsion system for expelling water from a hydropower plant having an energy conversion device includes a Cho-Venturi tube (CVT). The CVT includes an upstream conduit positioned to receive a primary flow of working fluid having a head pressure at a depth in a body of working fluid, a throat section, a diverging section positioned downstream of the throat section, and a converging section leading to a conduit for delivery of working fluid for hydropower generation. A recirculation circuit is fluidly connected to the throat section. The recirculation circuit recirculates a recirculation flow of working fluid from downstream of the energy conversion device to the throat section to combine with the primary flow to form a combined flow. A discharge passage is positioned to receive a portion of the combined flow from the diverging section to form a discharge flow for expulsion to the body of working fluid.

In another embodiment consistent with a claimed invention, an underwater hydropower plant is positioned at a depth in a body of working fluid and includes an energy conversion device adapted to convert kinetic energy of working fluid into mechanical energy. The hydropower plant includes a CVT having an inlet positioned to receive a primary flow of working fluid having a head pressure at a depth in the body of working fluid, and an outlet positioned to direct working fluid to the energy conversion device. A recirculation circuit is fluidly connected to the CVT to recirculate water from downstream of the energy conversion device to the CVT to combine with the primary flow to form a combined flow. A discharge passage fluidly connected to the CVT receives a portion of the combined flow to form a discharge flow for expulsion to the body of working fluid.

In yet another embodiment consistent with a claimed invention, a method of expelling working fluid from a hydropower plant having an energy conversion device includes flowing a primary flow of working fluid in an upstream conduit of a CVT, the primary flow of working fluid having a head pressure at a depth in a body of working fluid, and the CVT including a throat section and a diverging section positioned downstream of the throat section. The method includes recirculating working fluid from downstream of the energy conversion device to the throat section to combine with the primary flow to form a combined flow, and discharging a portion of the combined flow from the diverging section, or from downstream of the diverging section, prior to the energy conversion device to create a discharge flow. At least a portion of the discharge flow is expelled to the body of working fluid.

In another embodiment consistent with a claimed invention, a system for expelling working fluid from a power plant for a hydropower engine or generator includes a pressure vessel including an outlet and an inlet, and containing a working fluid and a pressurized gas in a head space of the vessel. The system includes a CVT having an upstream conduit positioned to receive a primary flow of the pressurized working fluid in the pressure vessel, a throat section, a diverging section positioned downstream of the throat section, and a converging section leading to a conduit for delivery of the working fluid for hydropower generation wherein an end portion of the diverging section of the CVT is fluidly connected with the inlet of the pressure vessel. A recirculation circuit fluidly connects to the throat section to recirculate working fluid discharged from an energy conversion device to the throat section such that the discharged working fluid combines with the primary flow to form a combined flow. A discharge passage is positioned to receive a portion of the combined flow from the diverging section to form a discharge flow for expulsion to the pressure vessel.

It is to be understood that both the foregoing general description and the following detailed description are exemplary and exemplary only and are not restrictive of the invention, as claimed.

BRIEF DESCRIPTION OF THE DRAWINGS

The invention may be understood by reference to the following description taken in conjunction with the accompanying drawings, in which like reference numerals identify like elements.

FIG. 3b shows a cross sectional planar view of the TS of the CVT shown in FIG. 3a.

FIG. 3c shows a cross sectional planar view at the end of the diverging section (DS) of CVT shown in FIG. 3a.

FIG. 3d shows a cross sectional planar view of a flow stabilizer in the diverging section of the CVT shown in FIG. 3a.

FIG. 4a shows a side view of Type II CVHR including a CVT according to an exemplary embodiment.

FIG. 4b shows a cross sectional anterior view of the TS of the CVT shown in FIG. 4a.

FIG. 4c shows a cross-sectional posterior view of the TS of the CVT shown in FIG. 4a.

FIG. 5a shows a side view of Type III CVHR including a CVT according to an exemplary embodiment.

FIG. 5b shows a cross sectional anterior view of a sparger in the CVT shown in FIG. 5a.

FIG. 5c shows a cross sectional posterior view of the of the sparger of CVT shown in FIG. 5a.

FIG. 8b is a top view of the bottom sub-level of the BSUHP shown in FIG. 8a.

FIG. 9b is a top view of buoyant tanks, columns, heave plates, and towers of the SFUHP shown in FIG. 9a.

FIG. 12a shows a vertical pressurized water column for the underwater hydropower plant on land (UHPL) according to an exemplary embodiment.

FIG. 12b shows a top view of the UHPL shown in FIG. 12a.

FIG. 14b is a side view diagram showing details of the exemplary MUG shown in FIG. 14a.

DETAILED DESCRIPTION

Figure 1:
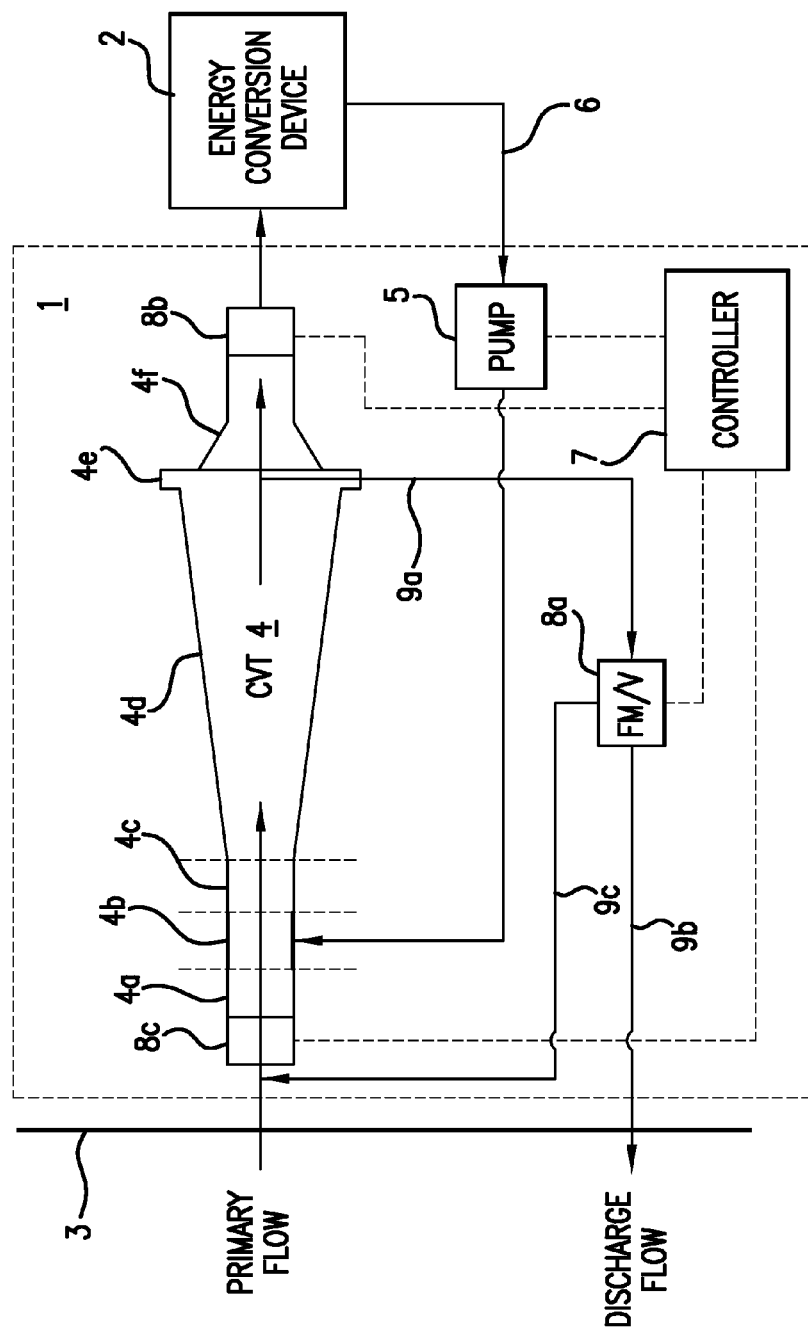
FIG. 1 is a diagram of a power generation unit (PGU) including a Cho-Venturi hydraulic ram (CVHR) system according to an exemplary embodiment.

The invention will now be described in more detail with reference to the attached figures. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Embodiments consistent with the claimed invention address a need for alternative ways and mechanisms to derive electric power using the immense underwater potential energy of a body of water, such as an ocean, lake, bay, etc., which is a renewable energy source and available abundantly on earth. The electric power generated from the potential energy can be large in scale. Additionally, it can be sustainable and not intermittent as found often with generation of power from underwater currents, tides, wind, and photovoltaic sources.

The potential energy of the body of water is converted into kinetic energy as a water stream which is then converted to mechanical energy by an energy conversion device, such as one or more hydraulic turbines. The energy conversion device can then drive a power generating device, such as one or more electric generators to produce hydroelectric power and/or drive another mechanism to perform mechanical work. More specifically, embodiments consistent with the claimed invention include a method and system for the expulsion of water (or other working fluid) discharged from hydraulic turbines in an underwater hydropower plant (UHP) to the depth of water at which the plant is positioned.

In an embodiment, a simple and effective device, which is named the Cho-Venturi Hydraulic Ram (CVHR), performs the task of expelling water discharged from an UHP into a body of water at a depth at which the UHP is positioned. The CVHR technology can offer several benefits in power generation: (1) a large-scale and sustainable hydroelectric power generation from an abundantly available and renewable energy source, (2) water expulsion from an UHP into the body of water at the same depth where pressurized water is introduced into the UHP for power generation, (3) increase in strength of hydropower through recirculation, (4) elimination of bubble cavitation, and (5) recycling the water discharged from an UHP back into the UHP.

FIG. 1 is a diagram of a power generation unit (PGU) including a CVHR system 1 and an energy conversion device 2 within the wall 3 of an UHP, according to an exemplary embodiment. As shown in FIG. 1, the CVHR system 1 includes a Cho-Venturi tube (CVT) 4, an axial flow pump 5 positioned along a conduit 6 for recirculating fluid from the energy conversion device 2, a controller 7 such as a microprocessor (µP), and flow measuring and control valve (FM/V) units 8a-8c that measure and control the amount of fluid flow. The controller 7 receives signals from the flow measuring of the FM/V units and controls the axial flow pump 5 and the valves of the units 8a-8c based on the measured flow values. Although single units combining a flow measuring device and a valve are depicted in the embodiment, it is to be understood that the functions performed by these units may be implemented using separate devices. For example, FM/V unit 8a can be implemented using two valves and two flow meters, where, for example one of the valves and one of the flow meters are positioned upstream from the other valve and flow meter.

The CVT 4 includes six sections: (1) an upstream conduit (UC) 4a; (2) a throat section (TS) 4b adjacent to the upstream conduit where the primary flow from the body of water having high potential energy and the recirculation flow from the energy conversion device (e.g., hydraulic turbines) proceed separately or partially combined depending on the type of CVT via the pump 5 and conduit 8; (3) a connecting conduit (CC) 4c wherein the combined flow surges and stabilizes to lead the next section, (4) the diverging section (DS) 4d where the energy from velocity of the combined flow is converted to static pressure; and (5) an end 4e of the DS 4d (EDS) where a division of the flow occurs to create two flows. A first flow from the end 4e of the DS 4d follows a path for expulsion out of the CVHR system 1 and flows along conduit 9a to conduit 9b and then out of the PGU through an opening in the wall 3. Part of this flow is diverted to recirculation conduit 9c for recirculation where it is combined with the primary flow before entering the CVT 4 again. The second flow from the end 4e of the DS 4d flows into (6) a second converging section (SCS) 4f of the CVT 4 that narrows to a flow conduit having the same diameter as the UC 4a. The second flow travels through the SCS 4f to the energy conversion device 2 where it generates power.

The fluid flow from the flow conduit of the SCS 4f is provided to the energy conversion device 2 via the FM/V unit 8b and a nozzle (not shown). In an exemplary embodiment, the energy conversion device 2 can be an impulse turbine (not shown). In another exemplary embodiment, the energy conversion device 2 can be a reaction turbine (not shown), where the size of the flow conduit of the SCS would vary because it would be connected to the system of a spiral case (SC) surrounding the turbine and governor.

The CVT operation begins with the primary flow from the body of water outside the wall 3 entering the CVT 4. A flow velocity develops in the UC 4a according to the Torricelli theorem. This velocity creates a reduced pressure at the TS 4b of the CVT 4 according to the venturi effect. The reduced pressure is lower than the supplying suction pressure under atmosphere, which facilitates pumping of the liquid discharged from the energy conversion device 2 into the conduit 6. Thus, recirculation of the water from the energy conversion device 2 to the CVT 4 can be conducted with minor expense of pumping energy by the pump 5.

The flow rate of the primary flow in the UC 4a and the flow rate of the discharge flow out of the CVT 4 must be maintained at a same rate, otherwise the UHP will flood. The controller 7 functions to maintain this balance by monitoring fluid flow in the hydraulic circuits using the flow meters (FMs) and by controlling the fluid flow by way of the valves (V). More specifically, the controller 7 receives signals from the FM/V unit 8a provided in the discharge flow path along conduit 9b and the recirculation flow path along conduit 9c, and from FM/V 8c upstream of the UC 4a where the combined primary flow and recirculated fluid flow is monitored path. Based on these received signals, the controller 7 controls the valves of these units 8a, 8b to maintain equality between the primary and discharge flow rates.

By maintaining the velocity of the recirculation flow above a certain level, for instance, above the primary flow velocity at the TS 4b, the increase in the velocity of the combined flow develops a pressure at or near the diverging section which is higher than the pressure outside the UHP. The ratio of the recirculation flow to the primary flow at the TS 4b can be greater than approximately 0.5. By selecting an appropriate recirculation flow rate and adjusting the length of the DS 4d, a desired pressure buildup at the end of the DS 4d is achieved, for example, a pressure that is high enough for water expulsion but not too high for an opportunity of shortening the length of the DS 4d. Note that the energy conversion in the DS 4d from kinetic energy to pressure energy depends on the length of the DS 4d and the angle of divergence. Specifically, the higher the kinetic energy of the fluid stream is at the start of the DS 4d from the CC 4c, the lower the pressure will be at that location. Thus, benefits of the recirculation include an enhanced pressure buildup at the end of the DS 4d for fluid expulsion out of the UHP. For example, pressure build-up steps up the strength of hydropower due to the increased kinetic energy of the combined water stream at a depth having a significant head pressure (i.e., at the depth of the UHP). Also, bubble cavitation can be reduced in the TS 4b because bubbles being swept into the section of high pressures developing in the diverging section by the recirculation flow forces these bubbles to be dissolved in the high pressure section 4d.

As will be described later in detail, locations in the PGU for fluid expulsion can include direct discharge to the body of water depth outside the UHP through a flow discharge station (FDS), or recycling fluid from the energy conversion device 2 to the inlet of a pressurized flow distributor (PFD), or a combination of the two locations. Benefits of recycling fluid to the PFD over the direct discharge of that fluid include reloading of the recycled stream with the high underwater static pressure due to proximity of the location to underwater high pressure; minimizing the likelihood of marine creatures and floating debris entering the power plant since the recirculation flow has already been filtered; decreasing the salt content of the seawater in the plant which minimizes the corrosive effects on the system's components by the use of ion exchange columns and membranes when these devices are disposed in the recirculation circuit; the removal of the silty particles in the seawater which cause erosion of plant structures; and the removal or recovery of dissolved gases in the fluid, such as carbon dioxide and oxygen.

Although the CVHR system 1 and its operation do not solely and directly generate power, the operation of energy conversion device 2 cannot be effectively achieved without the CVHR system 1 and operation because the UHP would flood in a short time period.

Figure 2A:
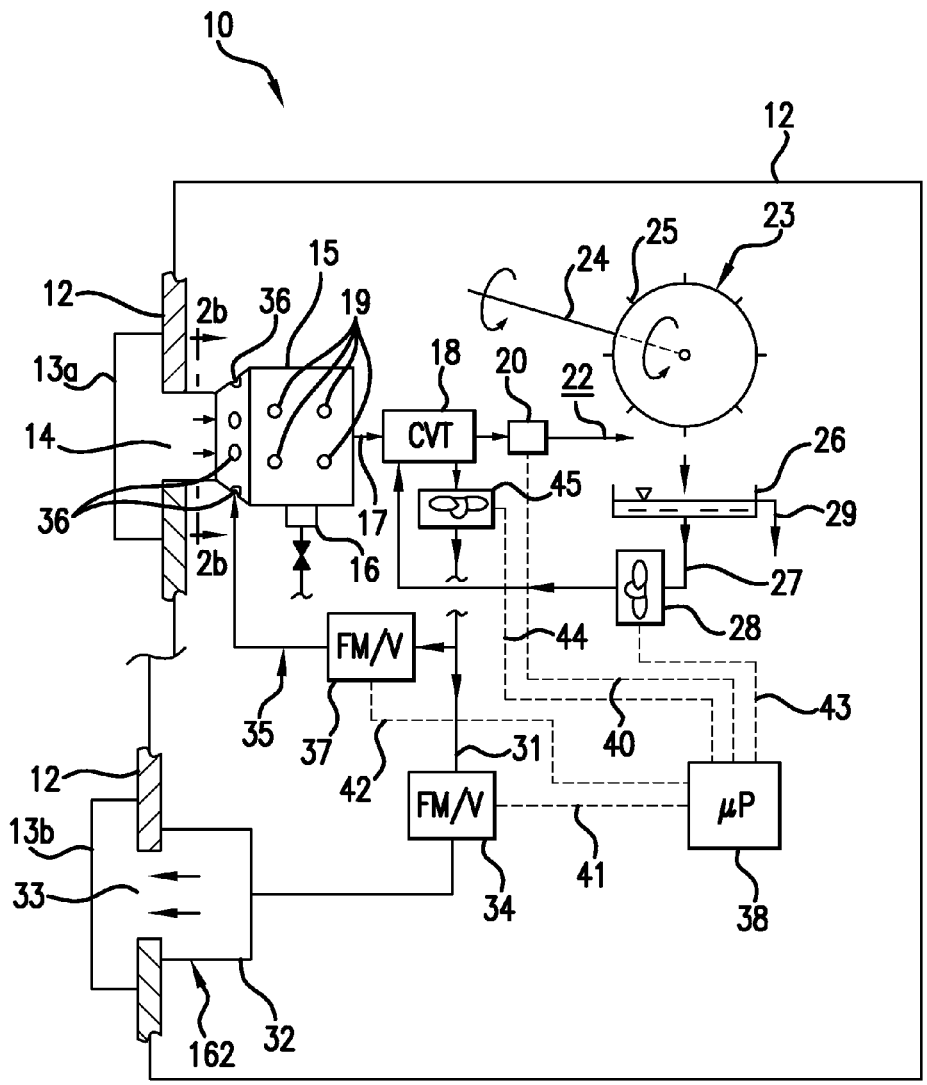
FIG. 2a is a schematic diagram of a PGU including a CVHR system according to an exemplary embodiment.
Figure 2B:
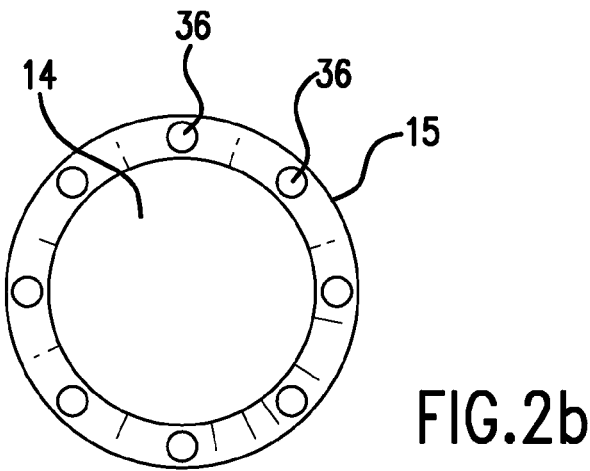
FIG. 2b depicts a cross sectional view of the openings on the circumference at the inlet of a pressurized flow distributor (PFD) shown in FIG. 2a for intake of the water from the CVHR.
Figure 2C:
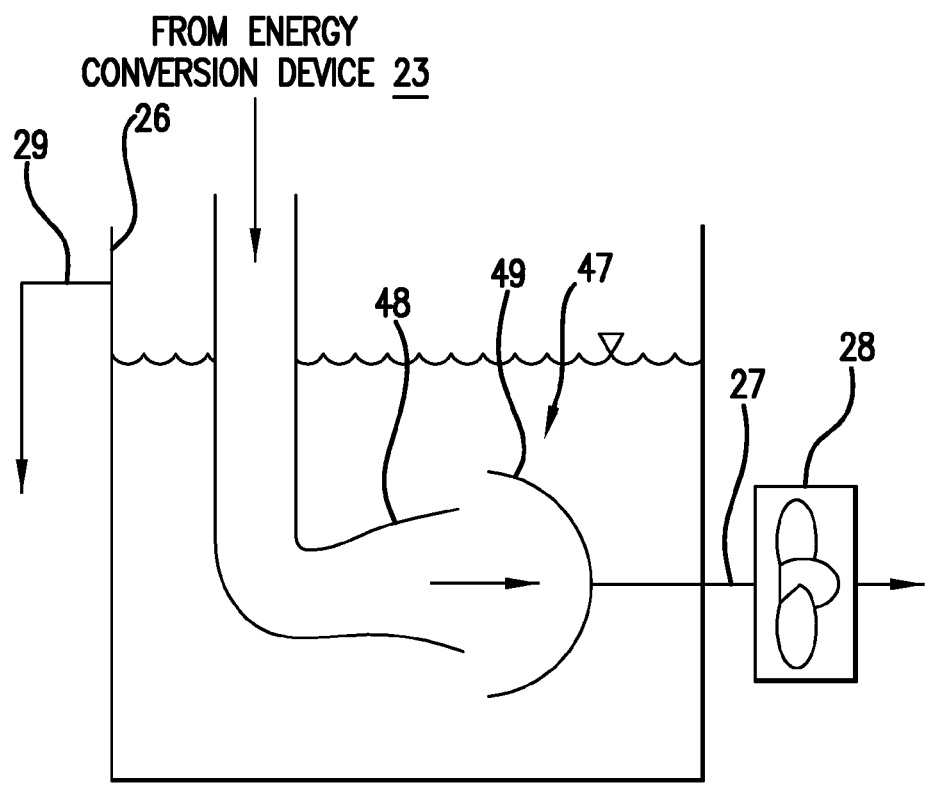
FIG. 2c is a schematic side view diagram of the draft tube of a reaction turbine and the water receiver for the recirculation flow to the throat section (TS) of the CVHR.

Reference is now made to FIGS. 2a-2c, which are diagrams showing a more detailed PGU 10 including a CVHR system according to an exemplary embodiment. Plural PGUs 10 can be provided in a power generating plant by stacking the PGUs 10 on several sub-levels of the plant (e.g., see UHP 500 of FIG. 8a, described later).

In FIG. 2a, the external wall 12 of UHP includes a flow box (FB) 13a installed at an opening 14. Attached to the opening 14 is a PFD conduit 15, which can be a metallic, cylindrical conduit extending horizontally from the wall 12 of the UHP toward the inside of the UHP. The FB 13a can be a circularly shaped open ring in reinforced concrete or metal with a width of about 3 to 6 feet. The FB 13a can include fishracks (not shown) on its inlet face to horizontally filter the entry of fish, other marine animals, and underwater debris while permitting water to flow through the FB 13a. The FB 13a protects the fishracks, which can be positioned on the PFD conduit 15, against vertically entering foreign objects and marine debris. The racks are preferably non-metallic, fluorocarbon-based heavy and coarse meshes. Each fishrack can be further protected by a heavy metal fence to stop the entry of the coarse debris from the body of water and to defend against charging sharks. The fishracks are cleaned and maintained by an underwater service chamber (USC), which is described later. A crane at the water surface, for example, on a deck of the UHP, can maneuver the USC which also can be self-propelled for traveling a short distance.

Preferably, the diameter of the PFD conduit 15 is no greater than 5 meters (16 feet), although the PDF conduit 15 can be any appropriate size to allow effective operation of the system. On the bottom of the PFD conduit 15, a collector 16 can be attached to recover accumulated debris that has entered the plant for disposal, for example, back to the ocean. The primary flow of fluid (e.g., water from underwater ocean) enters in the opening 14 and passes through the PFD conduit 15 and thereafter flows through a conduit 17 that is upstream to a CVT 18. The CVT 18 includes the six sections (i.e., the UC, TS, CC, DS, EDS, and SCS sections) described above with respect to the CVT 4 of FIG. 1. The CVT 18 is fluidly connected to a port of the PFD 15. Additional ports 19 can be provided in the PFD 18 to fluidly connect the PDF 18 to additional CVTs (not shown).

The PGU 10 includes at least one hydraulic turbine 23 including a shaft 24 that drives a generator (not shown) mounted on the shaft 24. At the end of the DS of CVT 18, the flow divides into two streams, and a first of the two streams flows from the CVT 18 into a system 20 that includes a spear valve and a nozzle. The system 20 provides a jet stream 22 that impinges on buckets 25 of the turbine 23 to turn the turbine with the shaft 24, and thus also the generator to produce electric power. The generator can be cooled by brine water (not shown). A water reservoir 26 under turbine 23 collects and holds the water from the turbine 23 in the reservoir 26 for recirculation to the TS of the CVT 18 by way of recirculation flow passage 27 and suction produced in the TS and the pump 28. An overflow pipe 29 is used to transfer any water overfilled in the water reservoir 26 to a compartment (e.g., see compartment 568 in FIG. 8b), which can be later purged from the PGU by pumping into the FDS via a conduit 162. The exemplary type of hydraulic turbine 23 shown here for purposes of illustration is Pelton impulse turbine. However, the PGU 10 can be implemented using other turbine types, such as a reaction turbine (e.g., a radial-flow Francis turbine or an axial-flow Kaplan turbine), depending on available pressure head at opening 14 or other design considerations.

Flow discharge from CVT is carried out through the pipe 31 which is connected at the end of DS. In order to avoid a possible back flow in CVT due to higher pressures developing at the end of DS, a discharge pump 45 can be included in the discharge pipe 31. The pump 45, in collaboration with the FM/V 34 in the pipe 31 and FM/V 37 in the branched pipe 35, controls the discharge flow rate, which is also regulated by the microprocessor 38 to maintain the same flow as the primary flow. The second of the two streams flowing from the end of the DS of the CVT 15 enters into a discharge passage 31 that is fluidly connected to an FDS 32 provided in an opening 33 in the wall 12 of the UHP 10. The second stream fluid flow rate is monitored in the discharge passage 31 and can be controlled via an FM/V unit 34 positioned in the discharge passage 31. An FB 13b similar to the FB 13a can be installed at the opening 33. Additionally, a branched conduit 35 fluidly connects the discharge passage 31 to the periphery of the inlet area of the PFD conduit 15 through one of plural ports 36 (also see FIG. 2b). Fluid flow in the branched conduit 35 is controlled via an FM/V unit 37. Although an embodiment of the PGU 10 can have the plural ports 36 fluidly connected to multiple branched conduits from other flow discharges from other CVTs (not shown), another embodiment can have as little as one port 36.

On the upstream end of the PGU 10, primary fluid flow enters through opening 14 and combines with any fluid introduced from the branched conduit 35 through ports 36. The combined fluid in the PFD conduit 15 can be distributed to one or a plurality of CVHR fluidly connected thereto. As the combined fluid flows through the CVT 18, it creates a pocket of reduced pressure in the TS of the CVT 18, which facilitates sucking fluid into the CVT 18 from the recirculation flow passage 27 with negligible consumption of pumping energy. As the combined flow moves in the DS of the CVT, the kinetic energy of water stream converts to the static pressure according to the Bernoulli principles. At the end of the DS of the CVT 18, a first portion of the fluid flow is discharged to outside of the UHP through FDS 32 or recycled to the PFD conduit 15, and a second portion of the fluid flow is delivered to the hydraulic turbine 23. On the periphery of the entrance of the PFD conduit 15, the number of circular openings 36 for intake of discharged fluid can correspond to a number of connected CVHRs.

The CVHR of the PGU 10 includes the CVT 18, the recirculation flow passage 27 from the hydraulic turbine 23, the pump 28 for assisting fluid flow in the recirculation flow passage 27, a microprocessor 38, an FM/V unit (not shown) positioned in the upstream conduit 19, the FM/V unit 34 positioned in the discharge passage 31 leading to the FDS 32, the FM/V unit 37 positioned in the branched conduit 35, the system 20 that includes the spear valve and nozzle, a flow measuring device (not shown) positioned in the recirculation flow passage 27 to measure the recirculation fluid flow rate, and signal lines between each of these devices and the microprocessor 38. The discharge pump 45 in the line 31 assures in keeping the two flows, the primary and discharge, at the same rate. The signal lines include a signal line 40 between the microprocessor 38 and the system 20; a signal line (not shown) between a flow meter in the recirculation passage 27, if any, and the microprocessor 38; a signal line 41 between the FM/V unit 34 and the microprocessor 38; a signal line 42 between the FM/V unit 37 and the microprocessor 38; a signal line between the FM/V unit (not shown) in upstream conduit 19 and the microprocessor 38; a signal line 44 between the pump 45 and the microprocessor 38; and a signal line 43 between the pump 28 and the microprocessor 38. The microprocessor 38 monitors the flow rates in conduit 19, the recirculation flow passage 27, the discharge passage 31 and the branched conduit 35, and guides and adjusts the openings of the valves in each of the monitored FM/V units and the speed of the pump 28 to set the required water flow in the hydraulic circuit.

FIG. 2c depicts an exemplary system of water recirculation for the reaction turbine 23, wherein a flow or water receiver 47 includes a draft tube 48 under the turbine 23 and a flow collector 49 having a half-moon shape to reduce the flow resistance when the water stream leaves the draft tube 48 to the flow collector 49. The overflow pipe 29 dumps any water overfilled in the water reservoir 26 to a compartment (see, compartment 568 in FIG. 8*b*). Detailed schemes of the flow control are presented in following sections.

The hydraulic turbine 23, pump 28, and the generator and the transformer (not shown) of the PGU 10 may be any appropriate conventional devices for the purpose and functions described herein. These devices are each preferably matched for required capacities to achieve efficient power generation.

The primary flow into CVT 18 and discharge out of CVT 18, are maintained at a same rate to avoid flooding that would occur in the UHP. To set a same flow rate, the UC of the CVT 18 and the discharge passage 31 and branched conduit 35 are each equipped with a FM/V unit, a discharge pump 45 which include a flow measuring device and valve pair (not shown). The microprocessor 38 monitors signals from the FM/V units indicative of the flow rate, which can be provided pneumatically, mechanically and/or electronically, and adjusts the openings of the valves in he FM/V units to maintain the flow rate target determined by the microprocessor 38. The microprocessor 38 also instructs the speed of the pumps 28 and 45 and the operation of the system 20 comprised of a spear valve and a nozzle to achieve the set goal. In a situation of flooding, the emergency power generators can be provided, for example, on a deck (e.g., see deck 546 in FIG. 8*a*) to supply power to activate pumps (e.g., see pumps 570 in FIG. 8*b*) to discharge the water to outside of the plant. At the same time, each shutoff valve (not shown in FIG. 3*a*) in the UC of the CVT can be closed manually or automatically to stop the water flow into the plant.

In FIGS. 3*a* to 6, four exemplary types of the CVHRs are presented. Elements having same reference numbers as those in FIGS. 2*a* to 2*c* are described above. These four types are but a few select representatives among several possible variations. Except for the throat portion of the CVT (i.e., the TS of the CVT), all four CVHR types can carry the same sections and pumps. The four exemplary types are:
1. Type I Cho-Venturi hydraulic ram ("CVHR I") in FIGS. 3*a* to 3*d*
2. Type II Cho-Venturi hydraulic ram ("CVHR II") in FIGS. 4*a* to 4*c*
3. Type III Cho-Venturi hydraulic ram ("CVHR III") in FIGS. 5*a* to 5*c*
4. Type IV Cho-Venturi hydraulic ram ("CVHR IV") in FIG. 6

Figure 3A:
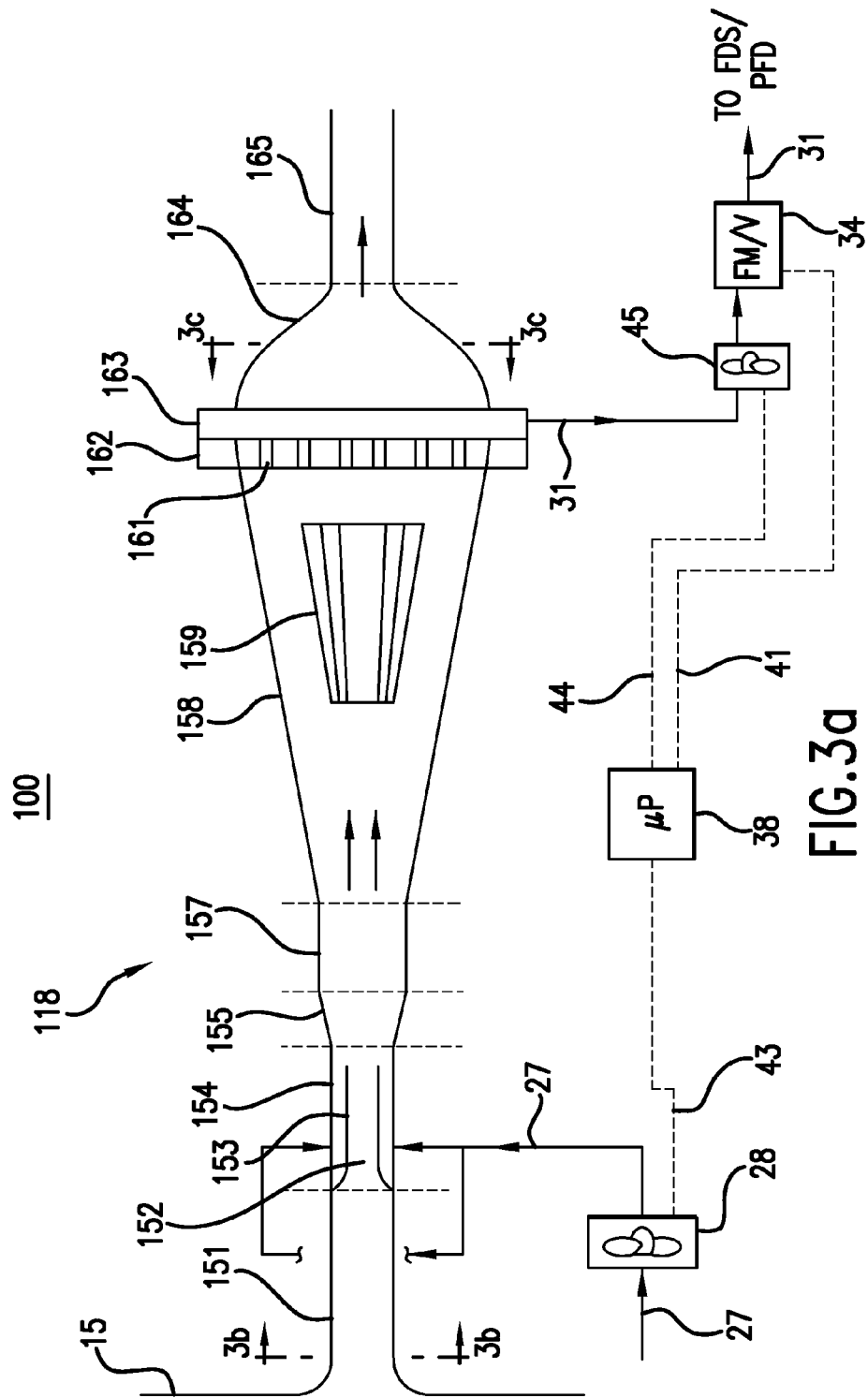
FIG. 3a shows a side view of Type I CVHR including a Cho-Venturi tube (CVT) according to an exemplary embodiment.

An exemplary Type I CVHR is shown in FIGS. 3*a* to 3*c*. FIG. 3*a* is a side view of a CVHR I 100 including a CVT 118 that is fluidly connected to the PFD 15. The CVT 118 includes an UC 151, a first converging section (CS) 152 formed by a TS 153 and the UC 151 and defining an annulus 154, a first DS 155, a CC 157, a second DS 158, a flow stabilizer 159, an SCS 164, and a downstream conduit 165. Although not shown, at the end of the pipe 165 the water stream transforms to a water jet to actuate a hydraulic turbine (e.g., see water jet 22 and hydraulic turbine 23 in FIG. 2*a*). The cross sectional planar view of the TS 153 forming the first CS 152 is shown in FIG. 3*b*, the cross sectional planar view of the end 162 of DS 158 is shown in FIG. 3*c*, and the cross sectional planar view of the flow stabilizer 159 is shown in FIG. 3*d*. The circular openings 161 along the annulus of the EDS (see, FIG. 3*c*) directs an equal volume of the primary flow 152 to the discharge line 31 through the annular compartment 163.

The diameter of the UC 151 can be, for example, about 1.22 meters (48 inches) for one turbine. The diameter ratio of the TS 153 to that of the UC 151 can be 0.707, for example, which is equivalent to the same flow areas at the throat for the primary fluid flow from the PFD 15 and the recirculation fluid flow from the recirculation passage 27, indicating the cross-sectional areas of the annulus 154 and the core (i.e., the cross-section of the CS 152) are same, although a different diameter ratio can be used.

Overall, there are six sections in the CVT 118: (1) the UC 151 connected to the PFD 15; (2) TS 153 created by the converging portion of UC 151 which are enclosed by the UC 151 forming the annulus 154 into which is introduced recirculation fluid from the hydraulic turbine(s) via the recirculation passage 27; (3) the CC 157 extending to the DS 158 via a short first DS 155, wherein an angle of divergence can be in the range of about 5 to 9 degrees, preferably in the range of about 6 to 8 degrees, and the primary flow in the UC 151 and the recirculation fluid merges to form a combined flow; (4) the DS 158 in which kinetic energy of the combined flow converts steadily to pressure as the flow passes along the DS 158; (5) the EDS 162 at or near the end of the DS 158 wherein the conversion of the fluid velocity reaches a pressure higher than the pressure outside of the plant. This is the location where the fluid flow divides into two flows: a discharging flow through discharge passage 31 for expulsion to underwater ocean via the FDS and/or recirculation to the PFD; and a flow for power generation that forms the jet stream 22 (FIG. 2*a*) directed toward the turbine for power generation. Section (6) of the CVT 118 is the second converging section (SCS) 164 for directing the stream into downstream conduit 165, which can have the same diameter as the upstream conduit 151 for an impulse turbine. For a reaction turbine, the size of the conduit 165 would vary due to the larger diameter of the spiral case surrounding the reaction turbine compared with that of the impulse turbine. The downstream conduit 165 (FIG. 3*a*) can house the system 20 (FIG. 2*a*) comprising a spear valve for controlling the flow rate, for example, during system shutdown, and a nozzle positioned along the conduit 165 for receiving the flow for power generation and causing a jet stream to impinge on the energy conversion device (e.g., the buckets 25 of the hydraulic turbine 23 shown in FIG. 2*a*).

The flow of the combined fluid in the CC 157 is affected by both the primary fluid flow from the PFD 15 and the recirculation fluid flow from the recirculation flow passage 27. Since the velocity of the flow is directly related to the power generation and the pressure development at the end of the diverging section, adjustment of these two flows is important. For example, for a synchronous generator attached to a hydraulic turbine, the rotation of the turbine is maintained a constant speed. Hence, significant changes in the flow are to be avoided. Minor adjustments to the fluid flow can be conducted by controlling the two flows by way of the system 20 including the spear valve and nozzle, and by controlling the speed of the pump 28. For instance, the microprocessor 38 can instruct the position of spear valve and the speed of the pump 28 to control the fluid flow. Speed regulation of a rotative impulse turbine is well known to a person of ordinary skill in this area. The minimum ratio of the recirculation flow to the primary flow is about 0.2, preferably between about 0.5 and 1.0 for effective development of the pressure at the end of the diverging section and, at the same time, boosting the water stream for power generation.

As described above, the hydraulic circuits in the UHP are controlled and maintained by the flow measuring (FM) devices capable of generating electronic or pneumatic signals such as by the turbine flowmeters, the electromagnetic flowmeters, the ultrasonic flowmeters, etc. and by the low-head valves (V) such as gate valves, which can be implemented separately or in FM/V units. In an embodiment, there are a total of three and one half units of the FM and V devices can be used in each PGU, in addition to the system 20 of the spear valve and nozzle. One unit is positioned in the upstream conduit 151 (the unit is not shown), a second unit 34 is positioned in the discharge passage 31 leading to the FDS 32, a third FM/V unit 37 (see FIG. 2a) can be positioned in the branched conduit 35 from the discharge passage 31 to the PFD 15, and a flow measuring device only can be positioned in the recirculation flow passage 27. The microprocessor 38 receives the signals from these various flow data rate sources and adjusts the openings of the valves in each of the FM/V units and the speed of the pump 28 to achieve a targeted flow in the hydraulic circuit.

In an embodiment, the angle of divergence of the section 158 is preferably in the range of approximately 6-8 degrees for a stable fluid flow in the DS 158 and to minimize flow separation. The flow stabilizer 159 also reduces the flow separation in the DS 158. In an embodiment, the flow stabilizer 159 can include layers 194 to 196 defining multiple cones positioned co-axially and in an overlapping relationship, i.e., within one another and centrally positioned within section 158, as shown in FIG. 3d. Flow separation and eddy formation reduces or can be minimized as fluid passes between the layers of the cones, i.e., between layers 194 and 195, and between layers 195 and 196. However, the use of a flow stabilizer 159 is optional when considering tradeoffs between reduction in flow separation and increased stability vs. frictional losses introduced by the surface of the stabilizer 159 when the liquid flows between the layers 194 to 196.

An exemplary Type II CVHR is shown in FIGS. 4a to 4c, which are views of a CVHR II 200 including a CVT 218 that is fluidly connected to the PFD 15. FIG. 4a is a side view showing a portion of the CVHR II from an UC 251 to a CC 257. The portions of the CVHR II not shown can be the same as any of the CVHRs described above. As shown in FIG. 4a, the shape of the hollow opening in the center of the UC 251 is formed with two curved plates 267a, 267b of, for example, curved metal disposed on opposite sides of the conduit 251 to form opposing D-shaped plates. The two curved plates 267a, 267b can be symmetrical on both sides of the pipe wall 251 to form a hollow flow passage (throat) 269 for the primary fluid flow. The curved plates 267a, 267b each include an anterior section 268 (i.e., at or near the entrance to the CVT) that extends gradually away from the wall of the UC 251 at a first angle, a mid-section 271 is generally flat, and a posterior section 273 having a slope that gradually extends toward wall of the UC 251 at a second preferred angle. In an embodiment, the first angle is approximately 19-21 degrees and the second angle is approximately 6-8 degrees, although another shaped profile can be used for the curved plates 267a, 267b. For clarity of illustration, elements included in both plates 267a, 267b, such as the sections 268, 271 and 273, are labeled only on the plate 267a.

A plurality of the circular openings 274 are formed on each of the curved plates 267a and 267b beginning on the flat mid-section 271 toward the downstream end of the posterior section 273 to create flow passages for recirculation flow 27 by the pump 28. The TS 266 thus created reduces the pressure to sucking in the recirculation flow to combine with the primary fluid flow, and the two fluid flows merge at the posterior hollow section of the throat 269. The anterior and posterior views looking into the throat section of the CVT 218 of CVHR II 200 are shown in FIGS. 4b and 4c, respectively.

The cross-sectional flow area of the throat 269 shown in FIG. 4b and the combined cross-sectional flow area of the openings 274 shown in FIG. 4c on both of the plates 267a, 267b can be designed such that they are substantially equal in size to alleviate the burden on the control system in controlling flow rates. The rate of flow of the recirculation fluid is kept at a velocity equal or higher than that of the primary fluid flow so that the pressure recovery at the end of the DS (e.g., see item 4d in FIG. 1 and item 158 in FIGS. 3a-3c) surpasses the underwater pressure outside the plant. The pressure buildup at the end of the DS is presented in FIG. 7a. All other sections and parts in the system of CVHR II are same as CVHR I in FIG. 4a.

FIGS. 5a to 5c are diagrams of another exemplary CVHR embodiment according to a Type III CVHR. FIG. 5a depicts a side view of the CVHR III 300, which includes a CVT 318 connected the PFD 15. The recirculation flow from the recirculation flow passage 27 is introduced into UC 351 using a "sparger" 377 mounted in a central position within UC 351. The sparger 377 has a teardrop or oval shape from the side view with an elongated tail section 381. The sparger 377 includes three sections: an anterior section 378 having a blunt forehead without any openings, a cylindrical mid-section 379, and the posterior elongated tail section 381. The sparger 377 is a hollow structure that forms an inner cavity and includes openings 382 formed on its surface to connect the inner cavity to UC 351. Recirculation fluid flow from the recirculation flow passage 27 is delivered by a transfer pipe connected to the front end of the anterior section 378 and then the fluid flows into the sparger 377 and then into the UC 351 via the openings 382. Openings 382 are positioned in the sparger 377 from the middle of the flat mid-section 379 to the end of the elongated tail section 381. Thus, an annular area is formed between the wall of the sparger 377 and the conduit 351 through which the primary fluid flow travels, as shown in FIG. 5b and FIG. 5c. When the primary flow from the underwater ocean runs through the annular area, a reduced pressure is generated in the annular area due to Bernoulli effects, thereby creating a suction force for the recirculation flow through the openings 382. The power of the suction force is further assisted by the recirculation pump 28. By adjusting the pumping power of pump 28 using the controller, or microprocessor 38, an equal or higher velocity of the combined flow than that of the primary flow in the annular area, is obtained. The detailed description of the diverging section of the CVHR III is the same as CVHR I in FIG. 3a.

Figure 6:
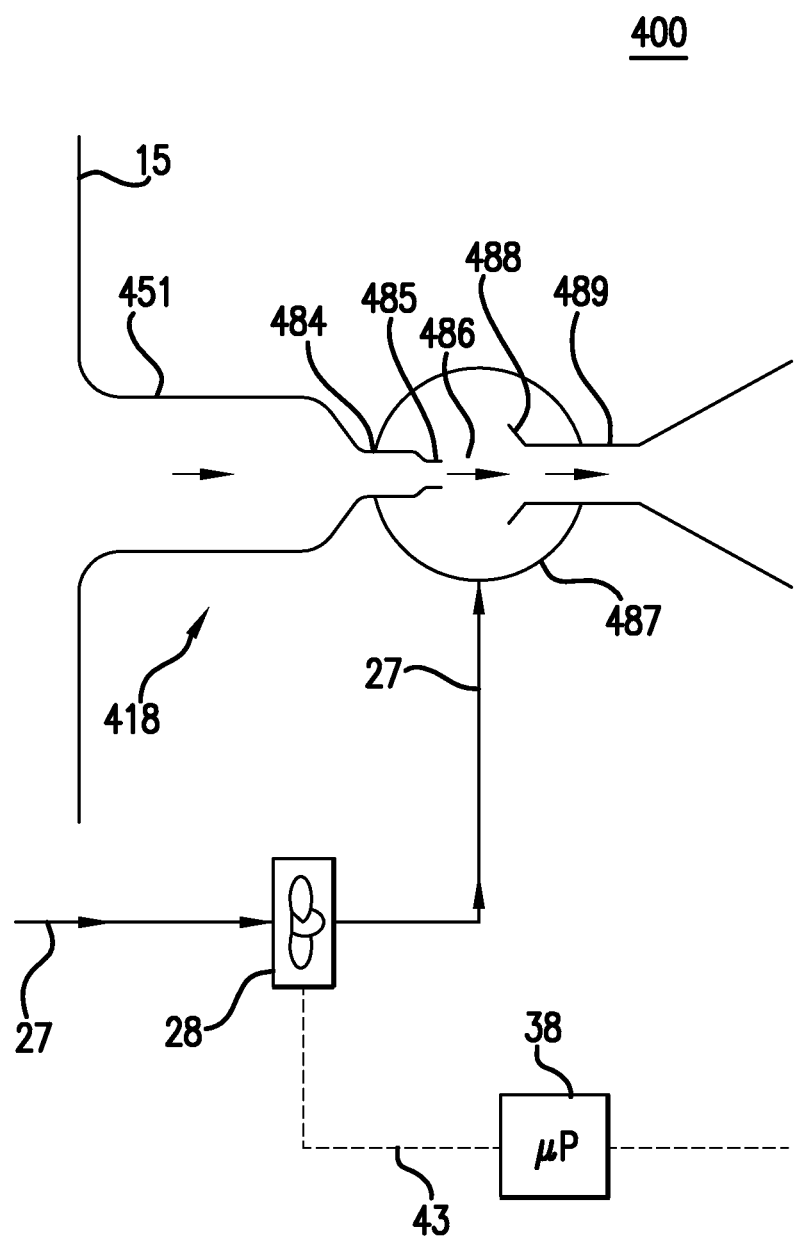
FIG. 6 shows a side view of Type IV CVHR and a portion of a CVT in the CVHR according to an exemplary embodiment.

FIG. 6 shows a side view of the CVHR IV 400 connected to a CVT 418, wherein only a portion of the CVT 400 and the pump 29 necessary for understanding the Type IV structure are shown. All other sections and parts of the CVT 418 in the system of CVHR IV are the same as in FIGS. 1 and 3a. The first half section of the CVT 418 is similar to an eductor or a liquid jet pump, which products are commercially available. The liquid jet pumps commonly known as eductors are primarily for absorption of gas into hot water or steam jets in a scrubbing system for removal of odorous and corrosive gases in chemical engineering. The eductor has been revised to the system of CVHR as a TS for power generation by CVHR. The receiver 488 of the eductor is connected to the CC, DS, EDS, and SCS of CVT, along with the recirculation pump 28 for expulsion of working fluid discharged from a hydraulic turbine. In FIG. 6, the primary fluid flow from underwater ocean flows through the UC 451 and a nozzle 485, which forms a liquid jet stream 486. When the fluid exiting the jet 486 impinges on fluid-filled, funnel-type receiver 488, vacuum pressure is created in a chamber 487 surrounding the nozzle 485 and the funnel-type receiver 488. This vacuum pressure along with the pumping power of the recirculation pump 28 accelerate fluid suction of the recirculation flow from the recirculation flow passage 27 into the vacuum chamber 487. The developed vacuum pressure in the chamber 484 sucks in the working fluid in the recirculation flow passage 27 that was discharged from the turbine (not shown), assisted by the pump 28 (e.g., an axial-flow propeller pump). By adjusting the velocity of the recirculation flow by the pump 28 above that of the jet 486, the velocity of the combined flow in the connecting pipe 489 is maintained equal or higher than that of the primary flow in the UC 451. The combined flow then begins to transform to static pressure in the DS of the CVT 418 (e.g., see item 4d in FIG. 1 and item 158 in FIG. 3a). As a result, a higher pressure is produced at the end of the DS than the pressure of the underwater ocean where the plant is located. Detailed of the sections of the CVT 418 other than the throat section described above is same as for CVHR I above with respect to FIGS. 4a to 4c, and for the CVHRs and CVTs shown in FIGS. 1 to 3c and described herein.

In an exemplary embodiment, an UHP can be positioned at a depth of up to 500 feet (152.4 meters) and having a cylindrical base diameter of 330 feet (100 meters). However, the depth and structural dimensions mentioned herein are not intended to be limiting as other depths and dimensions can be used to achieve the benefits and functions described herein. The following exemplary input data are employed to demonstrate the profiles of pressures and velocities in the six sections of a CVT at a few select recirculation ratios, $\beta_R$. Computational results are plotted in FIG. 7 and Table 1 lists a different set of calculation.

| Data | | |
|---|---|---|
| | Assumed idealized flow condition | No frictional loss |
| | Water depth, the continental shelf | 152.4 m (500 feet) |
| | Underwater static pressure at the depth | 16.33 bars (1,633 kPa) |
| | Type of hydraulic turbine | Impulse Pelton wheel |
| | Pipe diameter, the upstream conduit (UC) | 0.914 m (3 feet) |
| | Area ratio of the UC to the throat | 2.0 |
| | Specific weight of seawater, γ | 10.07 kN/m³ |
| | Cavitation water vapor pressure @ 15° C. | 0.02 bar (2 kPa) |
| | Jet diameter | 0.0762 meters (3 inches) |
| | Turbine efficiency | 85% |

Figure 7A:
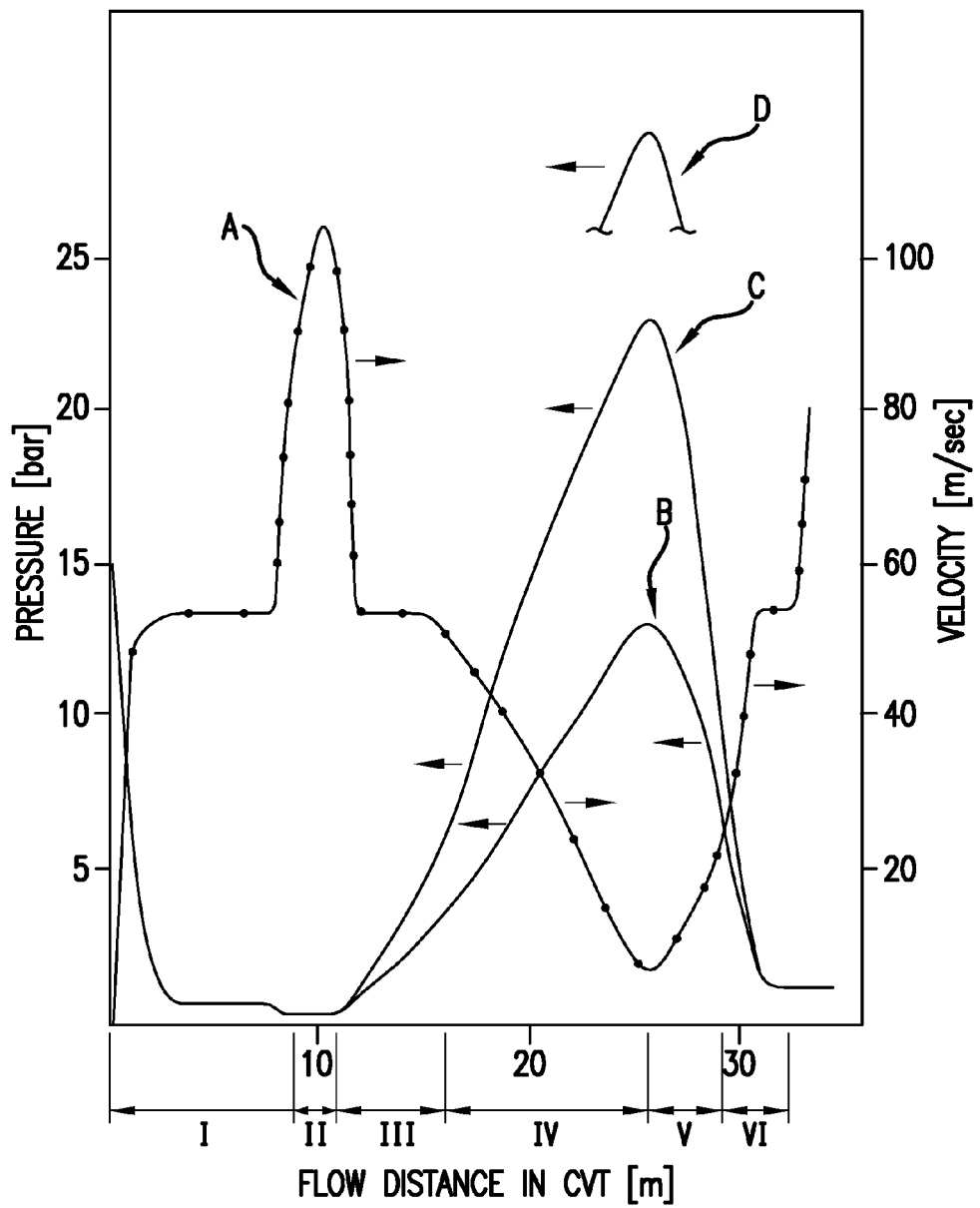
FIG. 7a is a graph showing profiles of pressures and velocities in sections of an exemplary CVT at various recirculation ratios and velocity settings.

FIG. 7a shows the profiles of velocities and pressures vs. flow distance in a CVT in accordance with CVHR Types I-III describe above. The x-axis shows the distance in meters along the six CVT sections (I-VI) and the y-axis on the left represents the pressures in bars and the right for velocities in meters/sec. The curves "A" and "B" are the profiles of velocity and pressure, respectively, in the absence of recirculation fluid ($\beta_R=0$). In other words, they are in an identical condition. The curves "C" and "D" represent the profiles of the pressures in CVT with $\beta_R=0.5$ for curve C and $\beta_R=0.75$ for curve D. As seen from the profiles, the profile of the velocity curve A is always in opposite direction to that of the pressure curves B, C and D, reflecting the mutual conversion between the velocity and pressure is effectively carried out in the CVT according to Bernoulli relationship. The curve A rises to a flow velocity of 54.7 m/s in the UC (section I) and it continues to reach at the peak value of 109.4 m/s in the TS (section II). Then, it gradually falls to a lowest value of 1.9 m/s at the end of DS (section IV). On the other hand, the corresponding pressure (i.e., curve B) shows that the underwater pressure of 16.33 bars (222 psi) at the water depth of 152.4 m (500 feet) falls to a value of 0.562 bars in the UC (section I) and it further drops to a lowest value of 0.02 bars in the TS (section II). The value of 0.02 bars is the cavitation vapor water pressure of at 15° C. At this point, the vacuum pressure of 0.02 bars sucks in the recirculation fluid from the reservoir 26 (see FIG. 2a) under the turbine 23, which is at atmospheric pressure to the TS (section II). Pump 28 (see, FIG. 2a) regulates the recirculation flow rate in the recirculation flow passage 27. Then, the vacuum pressure rises gradually to a higher value as the flow travels in DS (section IV) and reaches at a maximum value of 14.6 bars at the end of the DS. This pressure is still lower than 16.3 bars of the outside water pressure, indicating that the water discharge is not possible. With $\beta_R=0.5$ (curve C), and 0.75 (curve D), the trends in the sections I are the same as curve B but the pressures recoveries in section III and section IV are different. The peak pressures of the both profiles are much higher than that of curve B at the end of DS (section IV), allowing the water to discharge at or approximately at the depth of intake water. In situations where the recovery of the pressure at the end of DS is too high, there is an opportunity of shortening the length of DS to adjust a right discharge pressure. The situation allows an opportunity of shortening the DS and generates space in UHP for other purposes. This shortening does not affect power generation.

Table 1 was constructed using the Bernoulli relationship, showing the influence of the recirculation ratios, $\beta_R$, and three different velocity settings at the end of DS of CVT on the pressure buildups and the hydraulic power generation in megawatts. Three velocity settings, 10, 25, and 50 percent of the velocity of CC at the end were arbitrary selected to demonstrate the pressure development, $P_D$ (kPa). Since an ideal flow was assumed in the table, the actual pressures for expulsion would be slightly higher than that of the ideal flow assumed. The power generations, $P_H$ (megawatts) are computed at each selected $\beta_R$ and the velocity setting. The figures in the table clearly demonstrate that higher recirculation ratios are required since they produce higher pressure buildups, resulting the expulsion of water and, importantly, they generate higher hydroelectric power.

TABLE 1

Effects of Recirculation Ratios and Velocity Settings on Pressure Development and Power Generation

| Velocity settings at | Pressures | Recirculation Ratio, $\beta_R$ | | |
|---|---|---|---|---|
| the end of the DS | & Power | $\beta_R = 0.1$ | $\beta_R = 0.25$ | $\beta_R = 0.50$ |
| 10% of $V_C$ | $P_D$, kPa | 1838 | 237.3 | 3420 |
| | $P_H$, MW | 32.8 | 511.7 | 4094 |
| 25% of $V_C$ | $P_D$, kPa | 1740 | 2247 | 3240 |
| | $P_H$, MW | 32.8 | 511.7 | 4094 |
| 50% of $V_C$ | $P_D$, bars | 1393 | 1798 | 2590 |
| | $P_H$, MW | 32.8 | 511.7 | 4094 |

As can be seen in Table 1, the recirculation ratios change power generation from 32.8 MW with $\beta_R=0.1$ to 4094 MW for $\beta_R=0.5$, at a velocity setting of 10%. Almost 125 times increase in power generation is observed with the increase of the recirculation ratio. However, the power generations are not affected at all with different velocity settings at a same $\beta_R$. With 30 PGUs in the UHP, the hydropower generation is estimated at 123 gigawatts with $\beta_R=0.5$.

FIGS. 7b to 7e are graphs developed using Bernoulli relationships in connection with a prototype utilizing a Type I CVHR and a pressure vessel to simulate underwater hydrostatic pressures and can be used to predict whether a known recirculation flow ratio $\beta_R$ develops a pressure at the end of the CVT exceeding that of the pressure vessel. In each of FIGS. 7b to 7e, the ordinate y-axis represents the pressure in psia and the abscissa x-axis represents the recirculation ratio $\beta_R$. The expulsion pressures at the end of the CVT are shown by the solid line and a dotted line represents the pressure of the vessel. When the point of intersection with the solid line and a recirculation flow $\beta_R$ lies above the vessel's dotted pressure line, the recirculation of flow occurs. For example, in FIG. 7b, expulsion of fluid occurs when $\beta_R$ is 0.54 or above because this is where the intersection with the solid line position meets with a given recirculation flow ratio. The value of $\beta_R$ with 3,000 gpm of the recirculation flow and 3420 gpm of the primary flow is 0.877, which is the ratio needed for recirculation to occur.

Figure 7B:
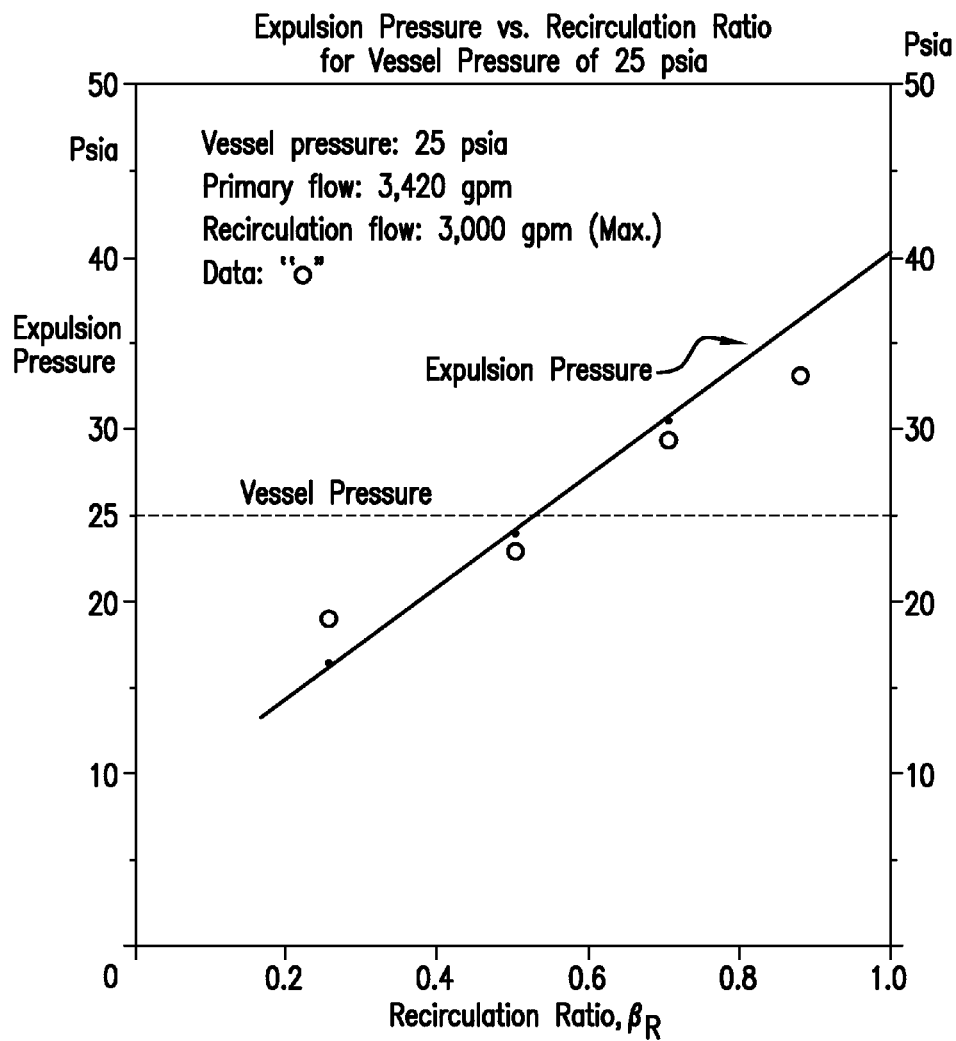
FIGS. 7b to 7e are graphs depicting a relationship between expulsion pressure and recirculation flow ratio.
Figure 7C:
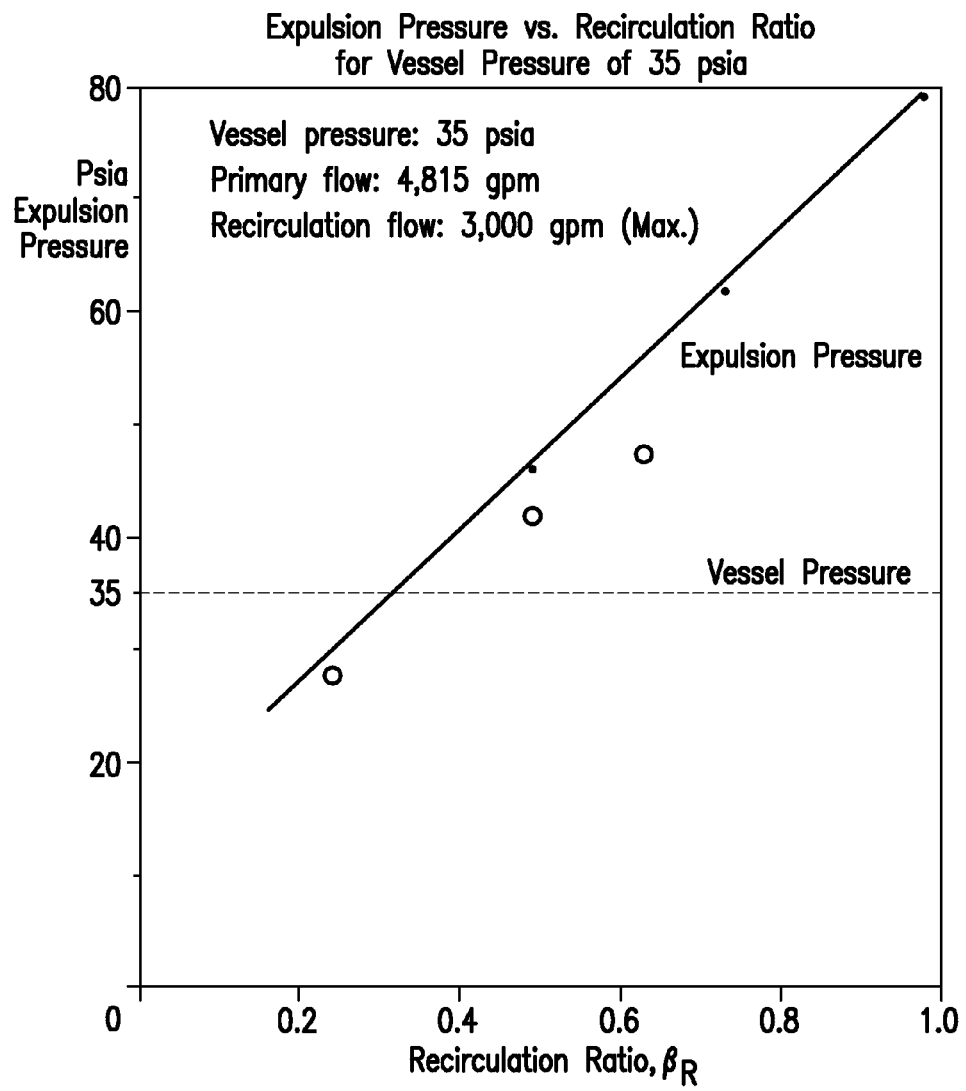
Figure 7D:
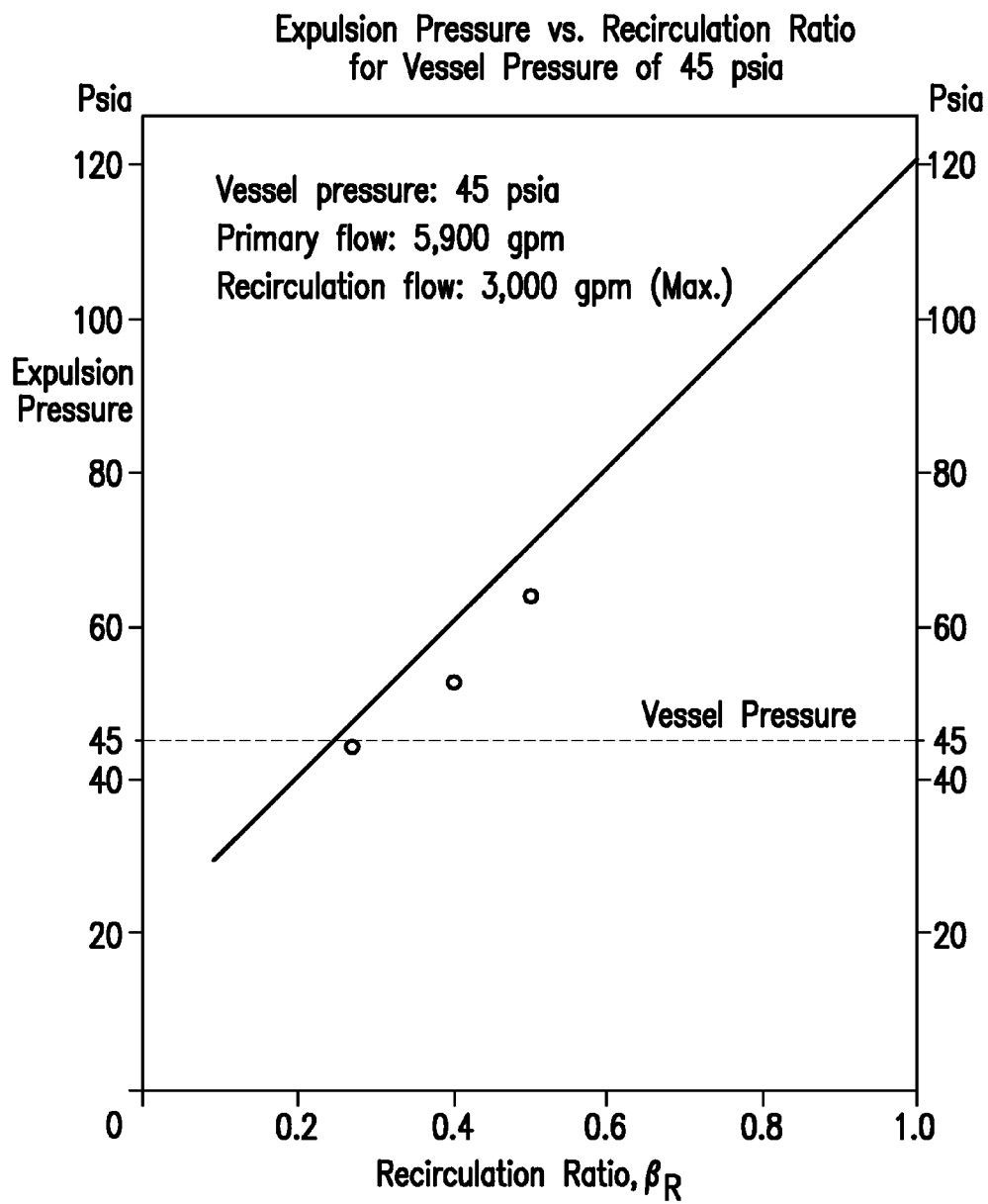
Figure 7E:
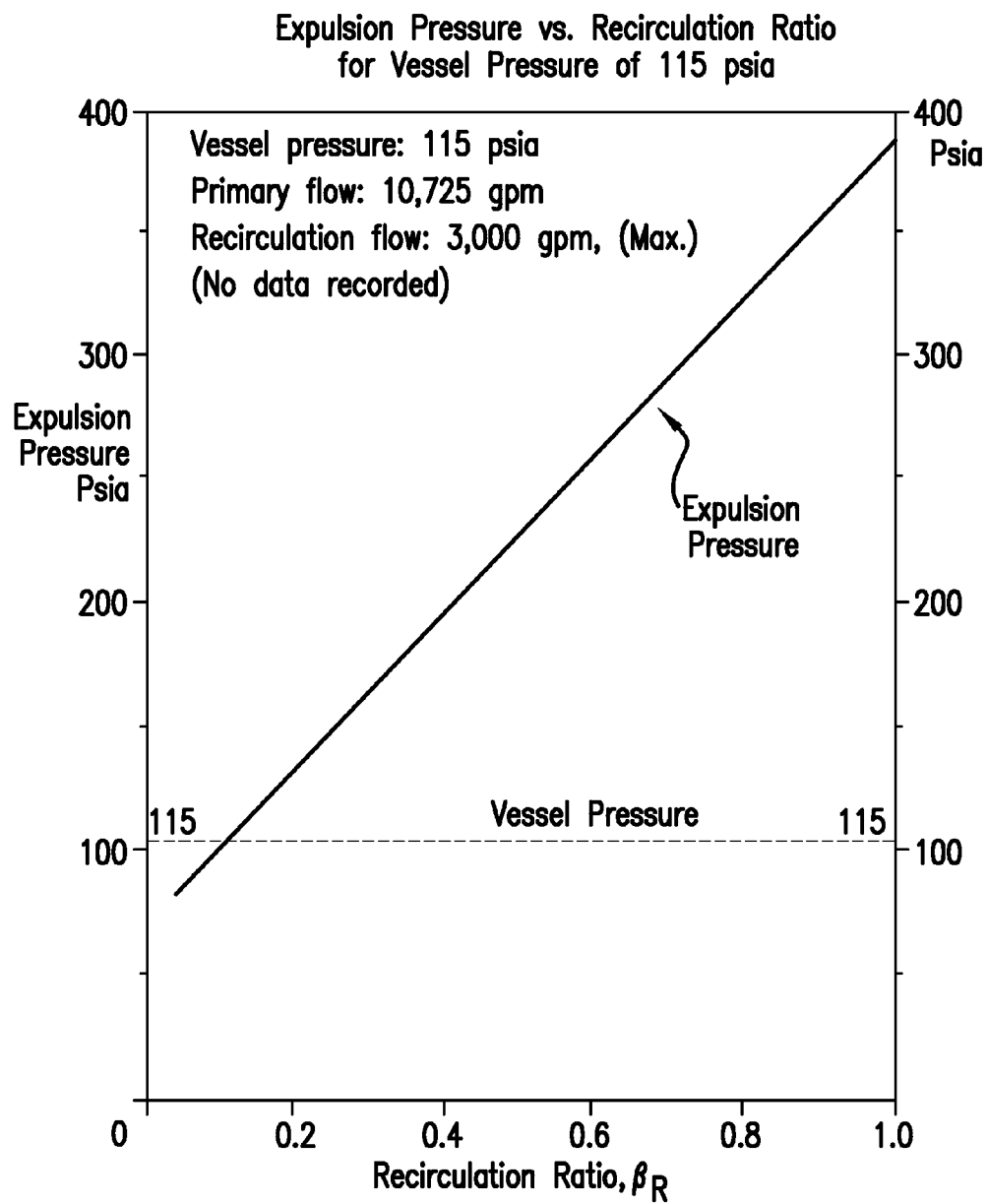

In FIGS. 7c and 7d, each water expulsion takes place when the recirculation ratio $\beta_R$ exceeds 0.32 and 0.24, respectively. It appears that the higher the vessel's pressure, the lower the recirculation ratio $\beta_R$. FIG. 7e shows calculated expulsion pressure for a vessel pressure of 115 psia. At that pressure, the recirculation ratio $\beta_R$ for expulsion takes place further down to 0.1. The blank circles in FIGS. 7b to 7d represent actual data recorded. As can be seen, there are four measurements in FIG. 7b, three in FIG. 7c, and three in FIG. 7d. These data points are very close to the solid lines predicted by the Bernoulli relationship. These data confirm that the flow return to the pressure vessel occurs whenever the velocities from the TS of the CVT exceed a certain value, because the velocity converts to a pressure along the DS of the CVT. At the end of the DS, the pressure reads a maximum value. These data also validate that the velocities developed in the CVT can be adjustable by changing the rate of recirculation. Thus, a selected recirculation flow rate determines the pressure development at the end of the CVT and determines whether the recirculation would create a repulsion pressure. Without the recirculation, the pressure developed at the end of the CVT never exceeds the vessel pressure, and thus no water expulsion.

Hydropower generation by a UHP is an efficient process, which can reduce or eliminate the need for nuclear power generation, the need for nuclear waste disposal from mining to plant decommission, and the danger related to weapon proliferation. An UHP can employ short penstocks, for example, each having a length less than 100 feet. Hydropower plants on land, on the other hand, require very long penstocks, for example, a mile or longer for water passages to a powerhouse to generate hydroelectricity by turbines and electric generators. Frictional energy losses associated with the water transport in these long penstocks cannot be neglected. The short lengths of penstocks in an UHP can significantly reduce or effectively eliminate such frictional energy losses.

Other benefits include the capability of continuously recycling the water released from turbines back to UHP during power generation and requirement of much smaller area for a plant. For example, an UHP embodiment utilizing the claimed invention can occupy less than one quarter of an acre on seabed for production of 123,000 megawatts with 30 PGUs. The Columbia River dam, for instance, requires several hundred acres of land (if not several thousands) in a remote and mountainous site. The cost of electric power transmission to population areas cannot be underestimated. The Grand Coulee dam, the third largest hydropower plant in the world, is located in a remote mountainous site in the State of Washington and supplies 6,495 MW of electricity with 27 generators at a rated head of 100 meters (330 feet), and the average water release is 110,000 cubic feet per second (cfs). The dams are under constant threat of draught and shortage of rainfalls and snowmelt. Yearly, average operational rates of these plants are around 50 percent. By contrast, the locations of UHP can be positioned very close to major metropolitan areas and in areas that are not significantly prone to changes in fluid depth.

As is known, the deeper the depth of the water, the higher the underwater potential energy at that depth. Thus, the potential energy at the entrance to any type of UHP is directly proportional to the depth at which the plant is positioned in the body of water. An UHP can include only one, but preferably includes a plurality of PGUs. Each PGU can include, among other things, a PFD, an FDS, an FB, a CVHR system, and an energy conversion device. In the case of an electric power generating, the energy conversion device of a PGU can include a hydraulic turbine, an electric generator, a rectifier, a power transformer, and auxiliary devices commonly found in a hydropower plant. Among these, the CVHR system plays a central role in power generation. Without the CVHR system, the plants would soon be flooded with the water discharged from the hydraulic turbines and thus incapable of producing power. As described above, a characteristic of the CVHR system embodiments is that the intake of the water for hydropower generation and the discharge of the water from the plant are executed continuously and at substantially the same underwater depth.

While PGUs including CVHR systems have been described above with respect to UHP, this is but one category in which the CVHR technology can be used. A second category in which the CVHR technology can be used includes underwater potential energy hydropower plants opened to air (UHPOA). Exemplary embodiments of these two categories of power plants are now described in more detail.

Plants of the UHP category need to be submerged in water with a watertight structure, but with a supply of air. There are three types of UHP: (1) a bottom supported hydropower plant (BSUHP) (FIG. 8a) wherein the plant structures sit on the bottom of the body of water, e.g., on a seabed by gravity; (2) a semi-submersible floating underwater hydropower plant (SFUHP) (FIG. 9a) wherein the plant floats in water due to buoyancy of the structure, and (3) the modular underwater generator (MUG) (FIGS. 14a to 14d) which depends on either buoyancy or gravity. The MUG (modular underwater generator) is a portable unit for the propulsion of marine and naval vessels, remotely operated vehicles (ROVs), autonomous underwater vehicles (AUVs), and stationary underwater power stations supplying electric power, for example, for oil drilling and gas exploration. The typical size of a MUG with one PGU can be, for example, in a cylindrical or rectangular shape about 30 m (about 100 feet) long, about 3 m (about 10 feet) wide and about 2.4 m (about 8 feet) tall, although an embodiment of a MUG can have a shape different from a cylindrical or rectangular and/or have other dimensions.

Figure 13A:
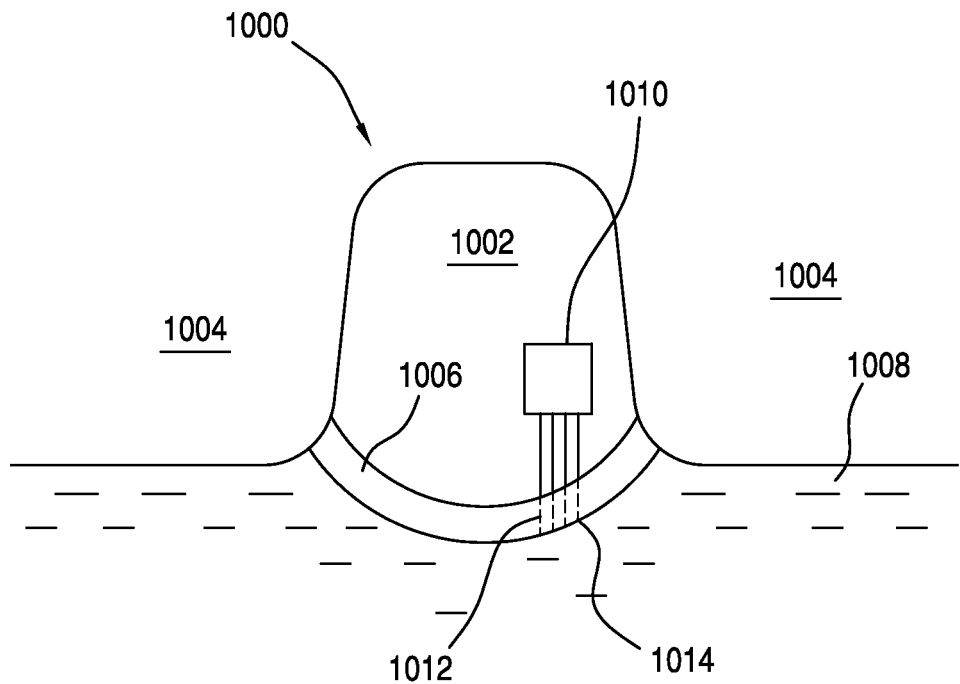
FIG. 13a is a top view diagram of a site for the underwater hydropower plants on a bay (UHPB) according to an exemplary embodiment.

For plants of the second power plant category opened to air, UHPOA, the plant containment or housing containing one or more PGUs does not need to be water tight and submerged in water because the plants are open to air. However, an UHPOA does need a natural or an artificial source of underwater potential energy near the UHPOA. Four types of UHPOA embodiments include: (1) underwater hydropower plant on land (UHPL) (e.g., see FIG. 12a), which depends on the underwater potential energy developed by stored working fluid in a vertical chamber, such as a pressurized water column (PWC) with a compressed gas in the head space, (2) underwater hydropower plants on a bay (UHPB) (FIG. 13a); (3) underwater hydropower plants on shorelines (UHPS) (e.g., see FIG. 13a); and (4) artificial island for renewable energy (AIRE) (e.g., see FIG. 13b). The UHPL type of UHPOA is a hydropower plant erected on dry land adjacent to a source of underwater potential energy such as a PWC filled with a working fluid and a compressed gas (e.g., air, nitrogen etc.) in the head space. Since the working fluid is being recycled in the UHPL by the CVHR, the fluid in the column does not need to be replenished. Additionally, loss of compressed gas from the head due to solubility of the gas in the working fluid under pressure can be negligible. The size of a column for the UHPL can be, for example, approximately up to 15 m (about 50 feet) in height and about 6 m (about 20 feet) in diameter with a number of power houses. With compressed air on top of the head space in the column, the energy head can be significantly increased, which can elevate power generation. A compact size of such an UHPL can have many applications as electric engines and generators. Each of the UHPB, UHPS and AIRE embodiments needs a naturally or artificially occurring supply of underwater potential energy. In some embodiments, the UHPB, UHPS and AIRE can be carried out by forming concrete barriers that separate, for example, a bay, a shoreline, or artificial island from the ocean (e.g., see FIGS. 13a, 13c, and 13b, respectively). Penstocks for power generation and the conduits for water discharge to and from an underwater depth can be fabricated across the concrete barrier. Water on the side of the barrier opposite the body of water such as the bay or the island is then transferred to the ocean to create a low basin with the same or similar depth of the ocean floor across the barrier. The basin is then prepared to act as a foundation for a series of hydropower plants.

Existing hydropower plants on remote and mountainous sites can be modified to incorporate CVHR technology described herein. Since the CVHR returns the water processed for power generation to the dam, theoretically no water is consumed for power generation. Limitations on this application is that the depth at which water is withdrawn for power generation and the depth at which water is discharged remains about the same, in addition to costs of modifications of existing dams.

A deck of an UHP can be supported above the surface of the water by towers and columns and can offer space for several needs and services (described later in more detail with respect to deck 546, and columns 524, 526, 528, and 530 shown in FIGS. 8a and 8b). For example, an UHP deck can include electrical substations, mechanical and operation rooms for the freight and passenger elevators, ports for vessels traveling between onshore and the UHP, a remote operation center (ROC) equipped with supervisory control and data acquisition (SCADA) system, emergency power generation facilities, machine shops, offices, air supply facilities for the plant, desalination plants, accommodation quarters, helipads and the operation centers for the underwater service chamber (USC) for cleaning the fishracks, and repairing and inspecting the structures of the exterior plant wall. The tower and columns are for passageways for electric power transmission cables, utility pipes and cables, breathing air to the UHP and maintaining atmospheric pressure in the plant for efficient performance of hydraulic turbines, and for the freight and passenger elevators. These elevators are necessary for a manned plant to maintain, repair, refit and replace the electromechanical energy devices in the UHP such as hydraulic turbines, electric generators, the CVHRs, gear boxes, etc, since these devices have finite lifetimes and need periodic service and replacement.

The huge deck space that can be created by a plurality of the UHP offers an opportunity for establishing runways for aircrafts, industrial facilities, military installations, a support center for the underwater strategic operation, hotels, recreational buildings, waste water treatment plant, hydrogen plant, ammonia plant, underwater research centers and living quarters.

IEC 61850 sets a standard for the design of electrical substation automation, in data modeling, report schemes, fast transfer of events, etc. All the electrical substations serving the UHP have to follow the standard: the underwater electrical substation (UES) (e.g., see item 538 in FIG. 8a) in the UHP, the offshore substation on the deck (OSD) (e.g., see item 544 in FIG. 8a) and the onshore substation (OS) (shown as item 536 in FIG. 8a). Electric power generated at the UHP may be transmitted to the OS through marine power cables (e.g., see item 536 in FIG. 8a) using high voltage direct current (HVDC). Other authoritative documents related to power generation and transmission governs the substations which include IEEE, ANSI, EPRI and USACE (EM 1110-2-3006).

Figure 8A:
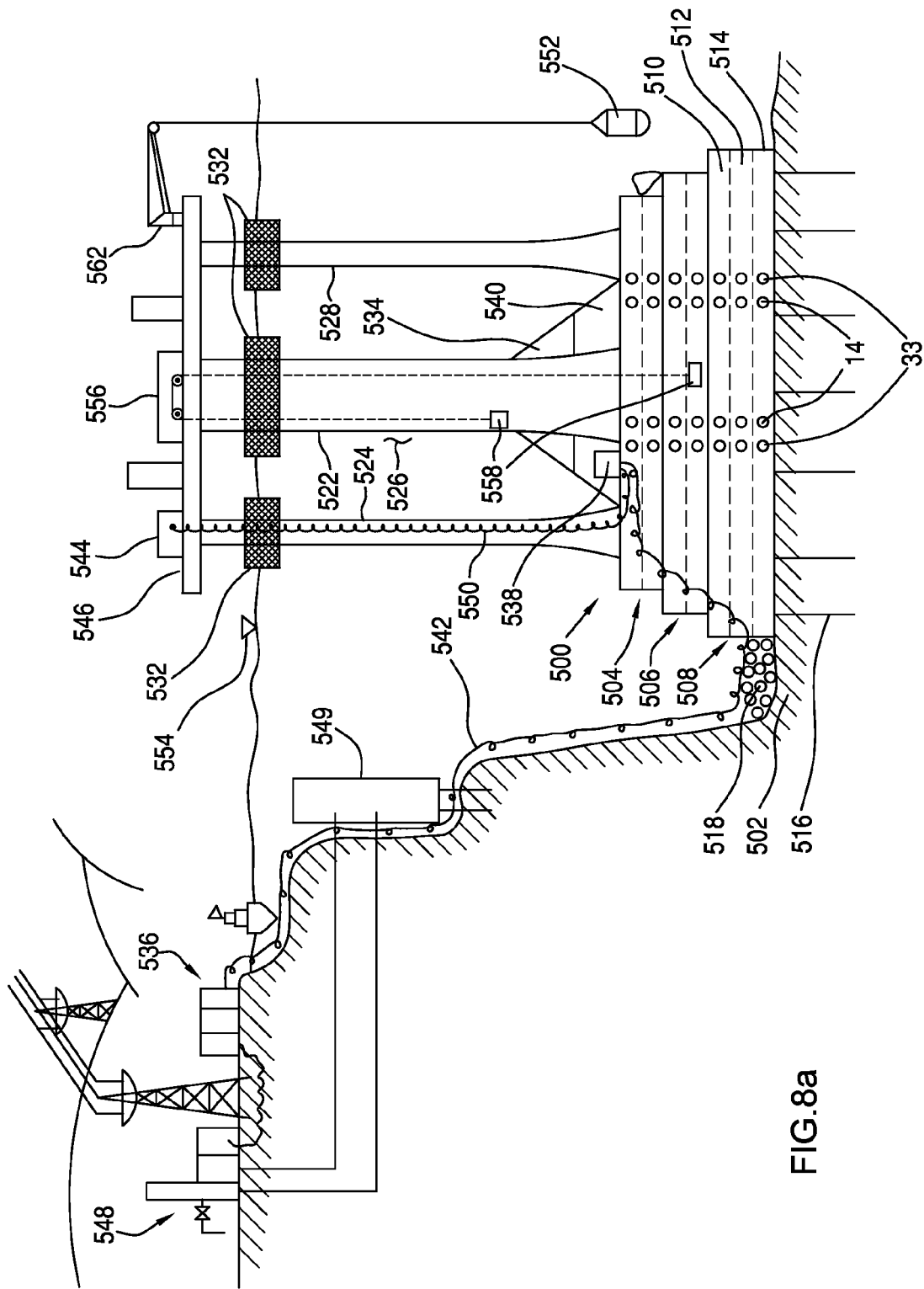
FIG. 8a is a perspective view of a BSUHP in accordance with an exemplary embodiment.
Figure 11:
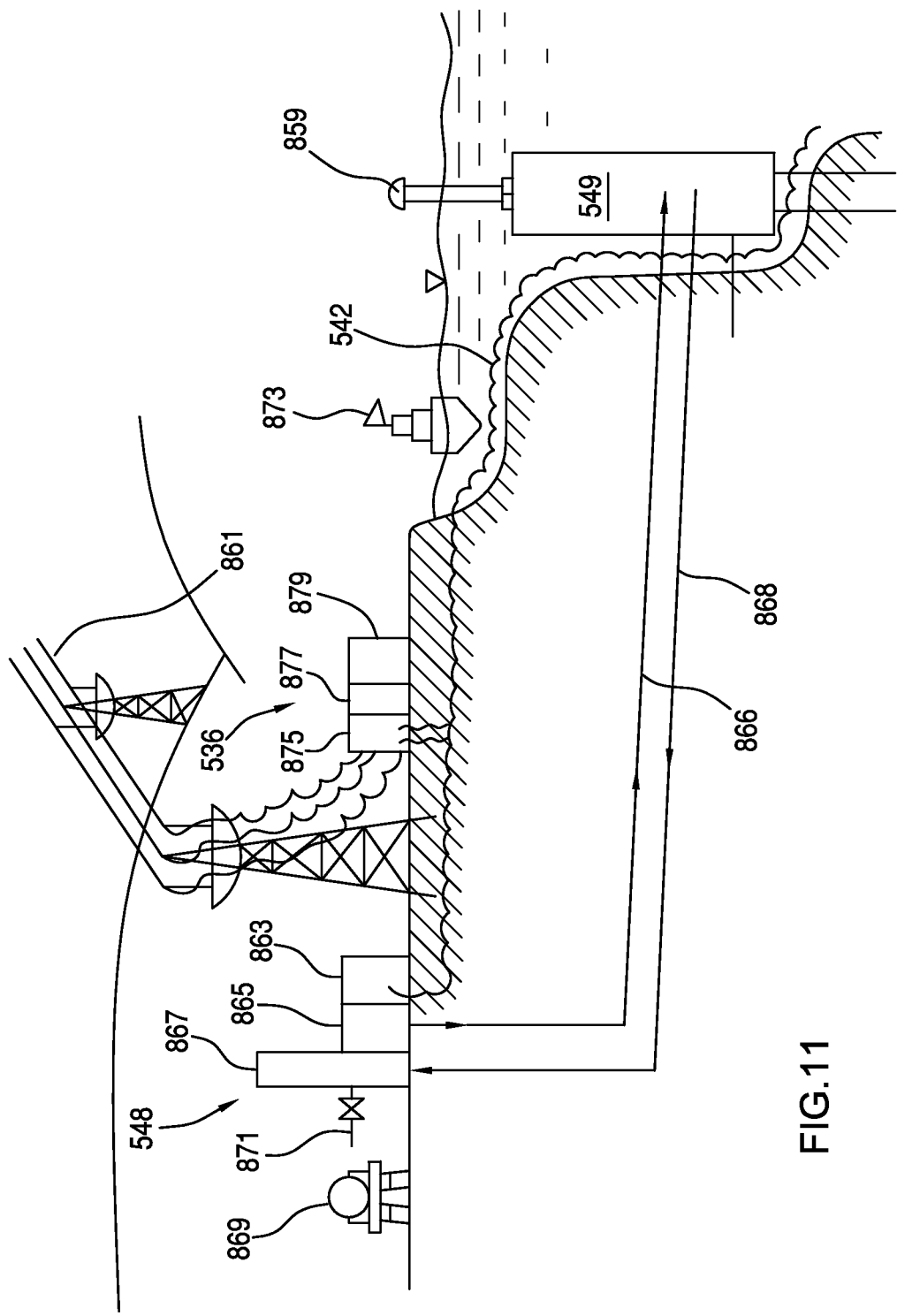
FIG. 11 is a perspective view of an onshore substation (OS), a hydrogen plant (HP), and an underwater hydrogen storage chamber (UHSC) according to an exemplary embodiment.

A portion of the HVDC received on the deck or onshore substation could be used for hydrogen production, for example, in a hydrogen production plant (e.g., see plant 548 in FIGS. 8a and 11). Commercially available electrolyzers, such as tank (unipolar) electrolyzers or filter-press bipolar electrolyzers, can be employed with the hydrogen production plant. The gas produced is then stored in one or plural underwater hydrogen storage chambers (UHSC) as compressed gas (e.g., see item 549 in FIGS. 8a and 11), liquefied hydrogen at cryogenic temperatures, metal hydrides, or adsorption in carbon materials at low temperatures. The low temperatures of most underwater, e.g., between 10° to 20° C. (50-70° F.) and the underwater storage minimizes explosion damage should the gas explode accidentally. The hydrogen storage chambers can be made of concrete and coated with corrosion-resistant materials such as epoxy resins, engineering adhesives, inorganic coatings such as aluminum silicates, aluminum oxides and chelating agents or combination of the above materials.

FIG. 8a is a perspective view of a BSUHP 500 on a seabed 502 according to an exemplary embodiment. FIG. 8b is a top view of the bottom sublevel of the BSUHP 500. The concrete structures of BSUHP 500 are fabricated with high-strength, reinforced concrete with coated steel, preferably with epoxy resin coat, on a prepared foundation. The external wall thickness of the BSUHP 500 may be any appropriate size but is preferably is up to 10 feet (3.1 meters) depending on the depth of water. The BSUHP 500 has three levels, 504, 506, 508 and each level has two sub-levels having a polygonal, square, rectangular, cylindrical, or other shape, except the bottom level 103 which has three sub-levels, 510, 512, 514. The BSUHP 500 can be stabilized by multiple, long skirts 516, to prevent possible sliding on the seabed due to the forces of current, waves, wind and earthquakes. The gravel piling 518 around the structures protects against the undersea scour to the plant.

Figure 8B:
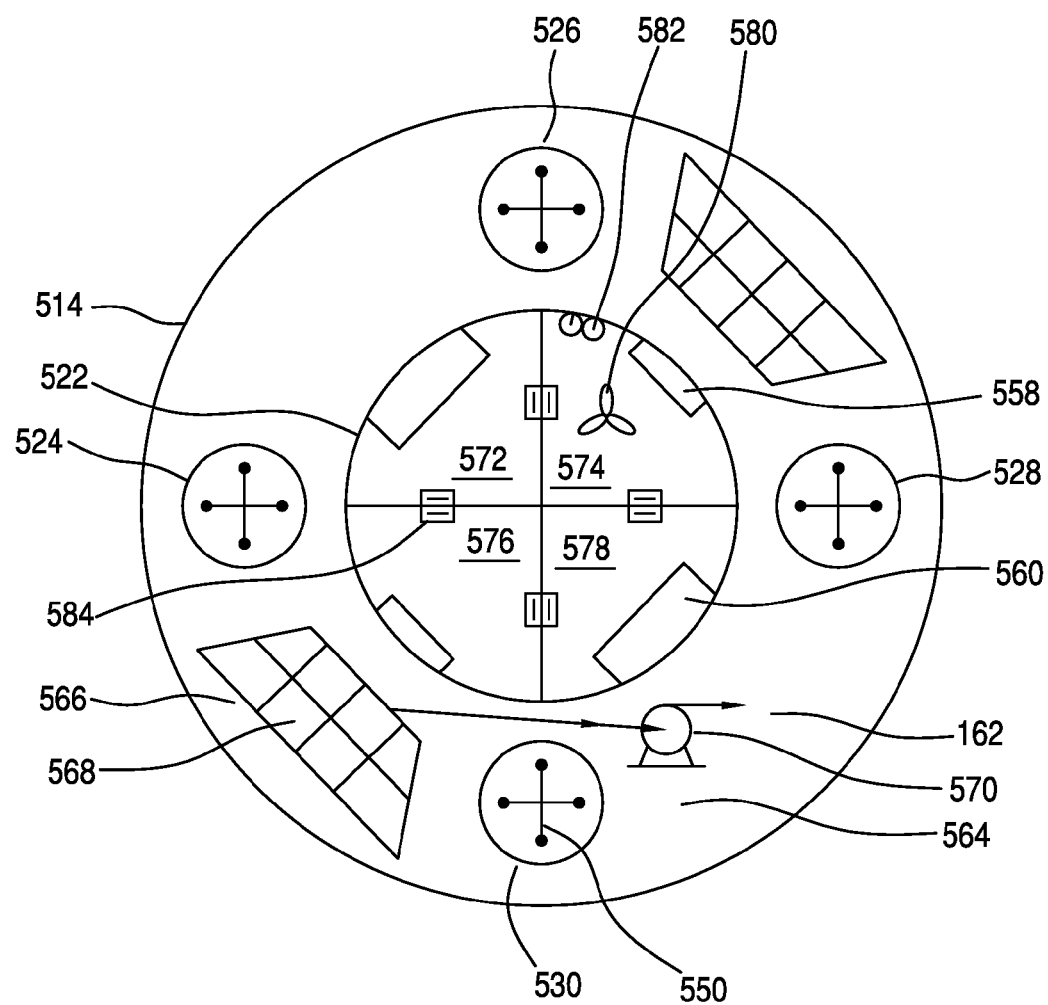

With reference to FIGS. 8a and 8b, the BSUHP 500 includes a tower 522, and columns 524, 526, 528 and 530. Wave breakers 532 reduce the impact force of waves on the tower 112, the columns 524, 526, 528 and 530, and BSUHP 500. The wave breakers 532 are important because waves are perhaps the most obvious environmental concern for operations of an UHP due to the possibility of raising stability issues, especially to a SFUHP. On the exterior wall of the BSUHP 500, a plurality of pairs of circular openings 14, 33 are positioned along the sublevels of levels 504, 506 and 508 and correspond, respectively, to the openings 14 and 33 shown in FIG. 2a. Each opening 14 is for the water intake to a PFD 15 (see, FIG. 2a) and each opening 33 is associated with a FDS to discharge the water from the PGU 10 (FIG. 3a) to the outside underwater. Each of the sub-levels of levels 504, 506 and 508 can house a plurality of the PGUs, electric rooms, offices, a kitchen and living quarters, which are not shown in FIG. 8a. The top level 534 can have an undersea observatory for monitoring and collecting data of underwater activities by sensors and cameras for fish migration, seismographic motion, current profiles, approaching marine mammals, submarines and marine vessels, and terrorist attacks.

Electric power generated in the BSUHP 500 is transmitted to the OS 536 from the underwater electrical substation (UES) 538 in the level 540, where the electricity is converted to HVDC and dispatches to the OS 536 through the marine bipolar power cables 542. Such a route of transmission avoids possible corona discharge when the power is sent to OSD 544 on the deck 546 of the BSUHP 500 through the tower 522 and columns 524, 526, 528, and 530 (see also FIG. 8b).

The HVDC received at OS 536 is inverted back to AC for transmission to a local electric grid and a portion of the HVDC is used for hydrogen production at the neighboring hydrogen plant 548, which is fluidly connected with an underwater hydrogen storage chamber (UHSC) 549. A portion of the electricity received at UES 538 from the electrical generators (not shown) is sent to the OSD 544 on the deck 546 by the cable 550 for consumption on the deck 546 and in the underwater service chamber (USC) 552. Thereby, the power is dispatched to the OS 536. Normally, the transmission of the power received at the UES 538 is converted to HVDC to directly transmit to the OS 536 through marine power cables 542.

The tower 522 and surrounding four columns 524, 526, 528, and 530 (see also FIG. 8b) support the deck 546, and extend from the bottom of the first sub-level 514 to an appropriate height above water surface 554, e.g., at least 80 feet to deck 546. On the deck 546, a number of supporting facilities (some of the facilities in the list are not shown in FIG. 8a) are as follows: the OSD 544, a remote operation center for the entire UHP equipped with SCADA, the mechanical and operational rooms 556 for the passenger elevators 558 and freight elevators 560 (see, FIG. 8b), a mechanical room (not shown) for air compressors to supply the breathing air to the BSUHP 500 and the USC 552. Ports (not shown) are also provided under the deck for parking of marine vessels traveling between the deck 546 and the OS 536. Details of the USC 552 are presented later with reference to FIG. 10. A crane 562 on the deck 546 provides the mechanical support for the USC 552 and duties of loading and unloading the freight and passengers from the vessels traveling between the deck 546 and the OS 536. Helicopters and the helipad (not shown) can be provided on the deck 546 to respond to the duties of transportation when weather is severe and unable to operate the ships.

FIG. 8b depicts the top view of the first sub-level 514 of the BSUHP 500 shown in FIG. 8a. One half of the space 564 is allocated for a plurality of PGUs, for example, a plurality of the PGUs 10 shown in FIG. 2a, and the other half for the water reservoirs 566 and the compartments 568 for collection of the water spilled in, or leaked into, the plant. A centrifugal pump 570 transfers the accumulated water in the compartments 568 to an FDS through a pipe (e.g., to the FDS 32 through the pipe 162 as shown in FIG. 3a) whenever the level of water in the compartments 568 reaches a certain capacity. The tower 522 occupies the central area of the sub-level, and the four columns 524, 526, 528, and 530 surround the tower 522. The tower 522 can have an approximate external diameter of 80 feet and a wall thickness of up to 10 feet. Each column 524, 526, 528, and 530 and the tower 522 provides passageways for the power cable 550 to transmit electricity to the deck 546 in FIG. 8a. Four sections 572, 574, 576, and 578 are shown in the tower 522 in which the sections 572, 578 can provide for passageways of the pair of the freight elevators 560 and the section 574, 576 can provide for passageways of the passenger elevators 558. Blow fans 580 can be provided in the tower and four columns to force air to flow to the BSUHP 500 from the deck 546 thereby supplying the required atmospheric pressure in the BSUHP 500. Utility pipes 582 are for the portable water supply, liquid wastes, and communication cables. Lights 584 can be installed at various spaced positions to illuminate the space.

Figure 9A:
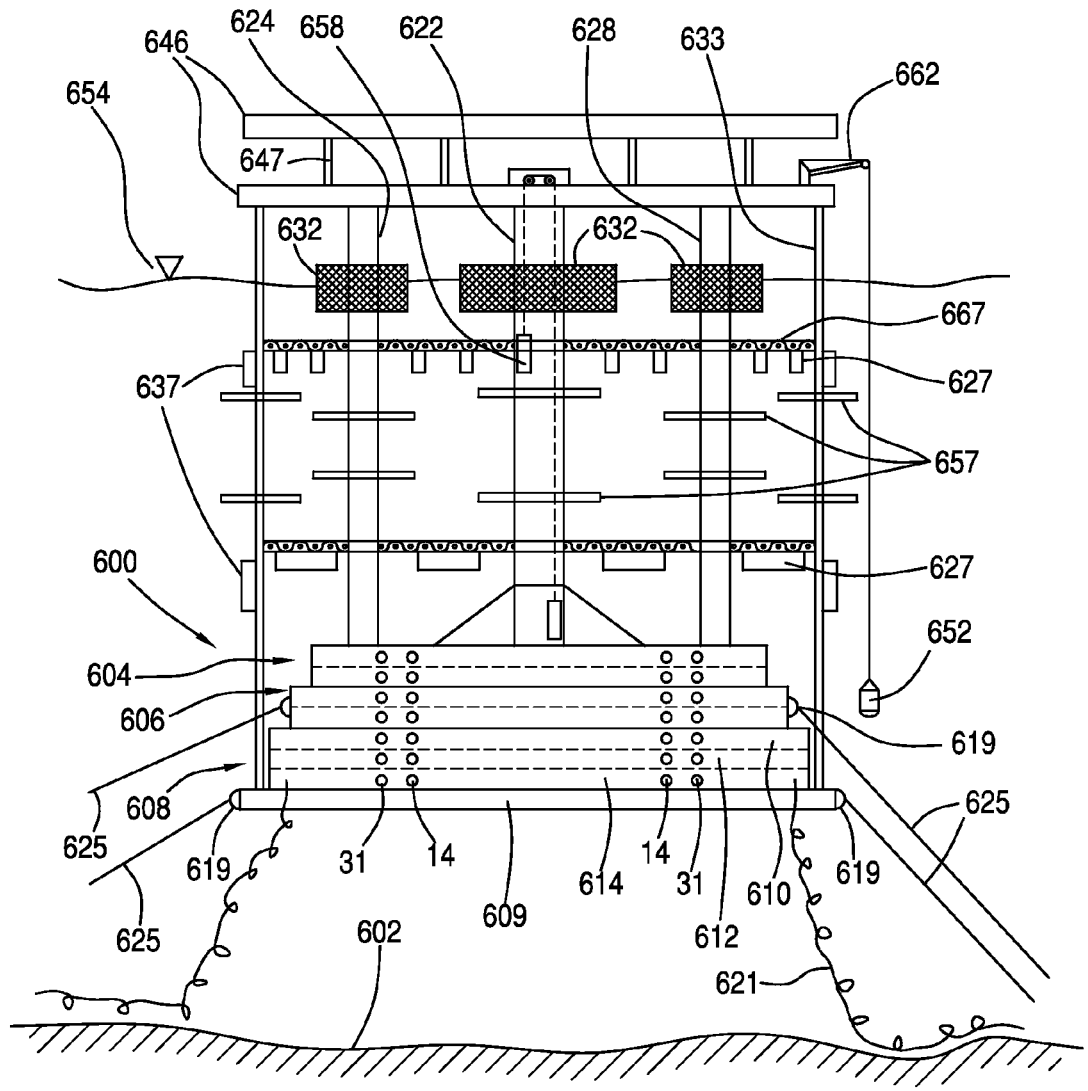
FIG. 9a is a perspective view of an SFUHP in accordance with an exemplary embodiment.

FIG. 9a is a perspective view of a SFUHP 600 in accordance with an exemplary embodiment. Because the SFUHP 600 has almost identical internal structures as BSUHP 500 in FIG. 8a, with a different numerical system (e.g., wave breakers 632, passenger elevators 658, USC 652, crane 662 etc.), repetition of the description is omitted here except for those not shown in FIG. 8a. A similar numbering scheme is utilized in FIGS. 10 and 11. The SFUHP 600 has four levels, 604, 606, 608, 609 and each level has two sub-levels having a polygonal, square, rectangular, cylindrical or another shape, except the bottom level 608 which has three sub-levels, 610, 612, 614, and the sub-level 609, which is the ballast chamber for seawater and compressed air. The concrete structures of SFUHP 600 and the tower 622 and columns 624, 626, 628 and 630 can be the same as, or similar to those of BSUHP 500 shown in FIGS. 8a and 8b.

As shown in FIG. 9a, SFUHP 600 floats above the sea floor 602 and is restrained by fairleads 619 provided at selected positions, which can receive a plurality of the mooring cables 625 that stabilize the structures of SFUHP 600 against the motion of the structures by underwater currents, waves, wind and tides. The bottom section 609 is the ballast chamber for seawater to control the buoyancy of the structures of SFUHP 600. The deck 646 has two layers above the water surface 654, which are supported by columns 647 to create additional deck space that can be used as a runway for aircrafts, recreational facilities, military installation, hydrogen and ammonia plants, in addition to for the operation of the UHP. Additional control of the buoyancy of the structure of the SFUHP 600 is obtained by the buoyant columns 633 and by various sizes of buoyant tanks 627, which are controlled pneumatically by the compressors (not shown in FIG. 9a) on the deck 646. The heave plates 657 are around the tower and columns (see, FIG. 9b for description). The SFUHP 600 is equipped with marine propellers 637 to provide the self-propulsion of the structure for relocation. Trusses 667 are provided to support the mechanical strength by bridging between the towers 622 and the columns 624, 626, 628, 630, and 633 (see FIG. 9b).

Figure 9B:
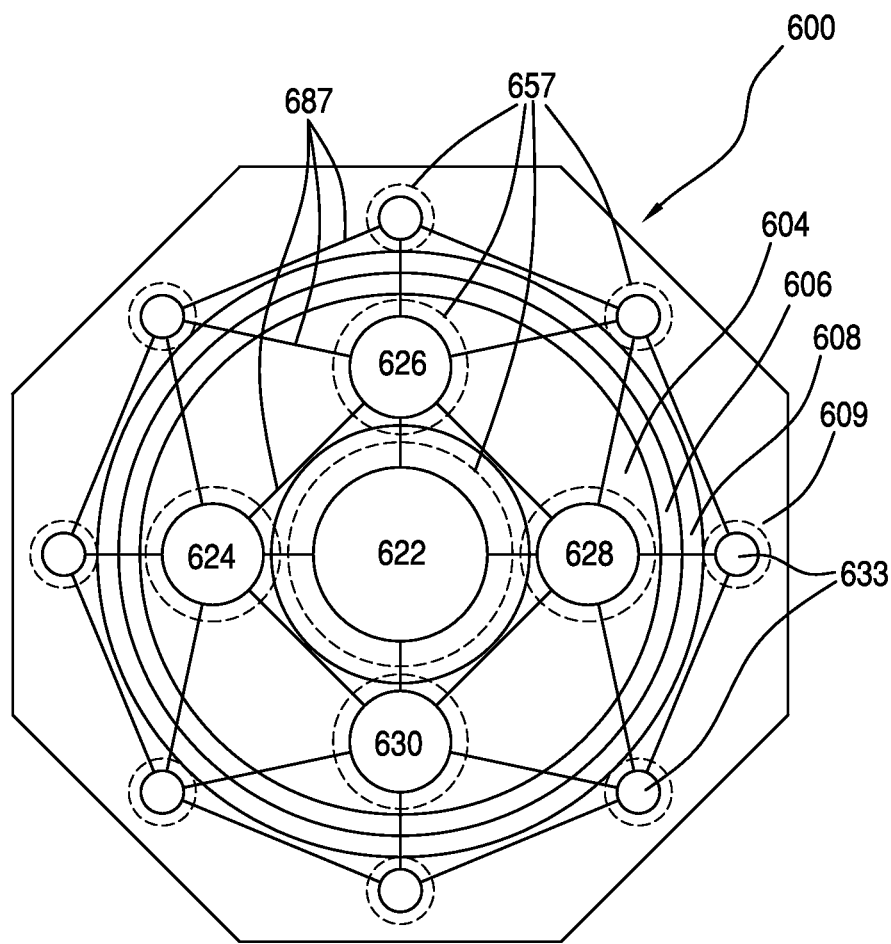

FIG. 9b is a top planar view on the mid-section of the SFUHP 600, wherein the central tower 622, the surrounding columns 624, 626, 628, and 630, and the buoyant columns 633 are held together by the bridging trusses 667 for mechanical strength. The heave plates 657 (shown by dotted circles around tower 622 the columns 624, 626, 628, 630, and 633) function to dampen the vertical motion of the structures 600 in response to passing underwater currents and surface waves. These plates 657 are disposed at various appropriate intervals, for example, approximately 50 feet, between the water surface 654 and the top level of the SFUHP 600 (see, FIG. 9a). The ballast chamber 609 along with the buoyancy columns 633 and various sizes of the buoyant tanks 627 (see, FIG. 9a) control the buoyancy of the SFUHP 600 through appropriate combination of the seawater and compressed air from the deck.

Figure 10:
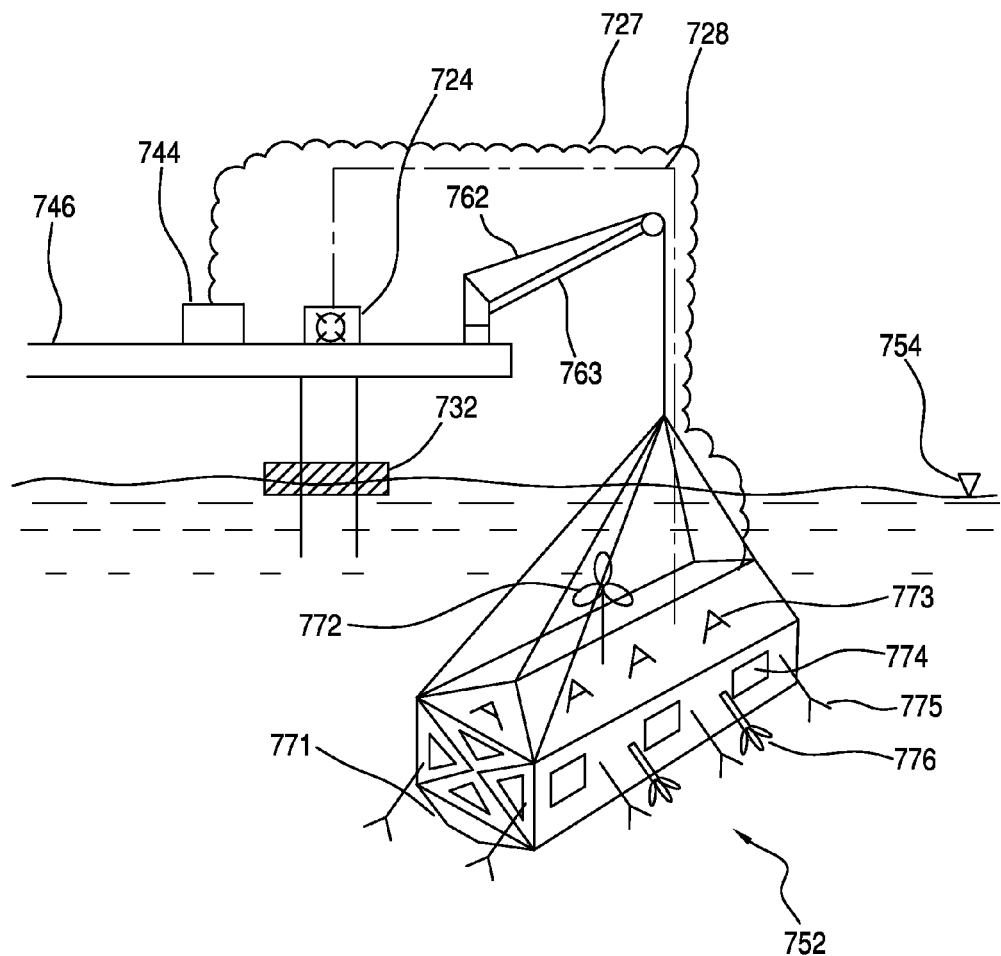
FIG. 10 is a perspective view of an underwater service chamber (USC) according to an exemplary embodiment.

FIG. 10 is a perspective view of an exemplary underwater service chamber (USC) 752, supported by a crane 762 on a deck 746 and a cable 763. The USC 752 is an ellipsoidal capsule capable of withstanding the water pressure at a substantial depth and carries the ballast tank 771 underneath the chamber 752 to adjust floatation. Once immersed, the chamber 752 is able to maneuver a short distance either by the crane 762 or by self-propulsion, i.e., marine propellers 772. The main function of the USC 752 is cleaning the fishracks and the flow boxes 13*a*, 13*b* (see FIG. 2*a*), maintaining and repairing the exterior structures of the BSUHP 500 (FIG. 8*a*) or SFUHP 600 (FIG. 9*a*), and inspecting the plant structure. Air supply is carried through the high strength flexible metal hose 728 from compressors in the mechanical room 724 on the deck 746. A hose 728 can be enclosed by metal protectors against possible attack from marine creatures. An electric cable 727 supplies the required electricity to the chamber 752 from OSD 744. Communication between the deck 746 and the chamber 752 can be provided through fiber optic lines (not shown). Visual inspection and repair works by the operators in the USC 752 are performed through the windows 774, using mechanical arms and claws 775 and globes 776, under the high intensity lights 773.

FIG. 11 shows more details of the exemplary OS 536, HP 548 and UHSC 549 shown in FIG. 8*a*. The OS 536 can receive the HVDC from an UES via cables 542 from the UES 538 or from the OSD 544 shown in FIG. 8*a*. The HVDC power received is then inverted back to AC prior to transmission to local electric grids through the AC power lines 861. A portion of the HVDC can be dispatched to the neighboring HP 548 or other chemical plant such as ammonia plant for hydrogen production (not shown). The HP 548 includes a facility 863, which employs a plurality of the filter-press type electrolyzers for water electrolysis to produce hydrogen gas. The hydrogen gas produced is then compressed by the multistage compressors facility 865 to store in the UHSC 549 via conduit as metal hydrides, a compressed gas, or liquid hydrogen. The UHSC 549 can be equipped with one or more safety relief valves 859. Onshore storage tanks 867 receive the stored hydrogen from the UHSC 549 via conduit 866 fluidly connected between the UHSC 549 and the storage tanks 867 for dispensing the gas to the tank truck 869 via a hydrogen unloading station 871. The delivery may also be carried out through, for example, ships 873 or railroad (not shown). Alternatively, the HP 548 could be installed on the deck 546 (see, FIG. 8*a*). At OS 536, the electric room 875 is for power conversion of the undersea HVDC delivered through the marine bipolar cable 542 to AC transmissions for a local grid. Part of the HVDC received is dispatched to the HP 548 for electrolysis. Control room and office 877 oversees daily operations of UHP, HP 548 and OS 536. Room 879 can be utilized for living quarters and a recreation room. At the HP 548, production facilities 863 house equipment needed for electrolysis of water to generate hydrogen gas. The gas produced is then sent to a compressor room 865 to send the gas through the line 866 to UHSC 858 and stored as a compressed or liquefied gas or as a hydride.

In an exemplary embodiment of an UHPOA, more specifically an UHPL, a storage system can be provided on land to store a body of water for power generation. FIG. 12*a* is a diagram of an UHPL system 900 including a vertical pressurized water column (PWC) 902 for creation of the underwater potential energy by body of fluid in the form of water 904 stored in the PWC 902, although it is to be understood that a working fluid other than water can be used. FIG. 12*b* is a top view of the PWC 902 and adjacent structures. The column preferably has a generally cylindrical shape and can be sized appropriately for effective functioning of an UHP. In an embodiment, the PWC 902 can have a size of approximately 50 feet high and a diameter of 30 feet. However, a much smaller unit could be erected for residential or commercial use and the shape of the column may be cylindrical, square, rectangular, polygonal or some other suitable shape. The PWC 902 can be constructed of concrete and/or metal and erected on the foundation 906. Side supports, such as concrete side wings 908 having, for example, a triangular shape extending from the foundation 906 can be provided for additional stability and support. While only one side wing 908 is viewable in FIG. 12*a*, four side wings 908 are viewable in the top view of FIG. 10*b*.

The head space 910 of the PWC 902 can be filled with a pressurized gas, such as nitrogen or air, which solubility is relatively low even at elevated pressures. The gas in the head space 910 is pressurized by a compressor housed in an adjacent UHPL in the UHPL power house 912 and delivered through pipe 914 to raise the pressure head of the liquid 904 in PWC 902. It is to be appreciated that means other than pressurized gas, such as a piston weight, can be used in the PWC 902 to provide pressure on the body of water 904. Emergency valves 915 are provided on top of the PWC 902 for discharging water and gas/air from the head space 910 of the PWC 902, for example, in an emergency situation. The column wall 920 is able to sustain the internal pressure of the UHPL 902, and can be fabricated with reinforced concrete, for example, supported internally by metal columns and bars cross-linked vertically and horizontally.

The UHPL in system 900 of FIG. 12*a* can employ the CVHR technology to generate sustainable power by directing working fluid through the conduit 916 for hydroelectric power generation and the discharging the working fluid back to the PWC 902 through the conduit 918. One or more PGU 10 may be housed in the UHPL power house 912. Compressors in the UHPL supply pressurized air on the head space to boost the total energy head level of the underwater potential energy of the PWC 902. In an area where severe freezing weather prevails, the water may be replaced or mixed with an environmentally friendly solvent such an antifreeze (e.g., propylene glycol) or can be mixed with a salt to lower the freezing point of the water. Such an UHPL with a compact size of about 0.114 m$^3$ (about 30 gallons) to about 0.751 m$^3$ (about 200 gallons) of PWC capacity and the systems of CVHRs may be employed for use of powering hydroelectric engines or generators.

Alternatively, the vertical PWC 902 as shown in FIG. 12*a* can be converted to a reduced size in height and volume for a metallic pressure vessel. With the head space of the vessel charged with compressed gas (e.g., air, nitrogen or other gases or mixtures of gas) and connecting on the side of the vessel to one or more CVTs, respective recirculation hydraulic circuits, pumps (e.g., axial flow propeller pumps), controller (e.g., microprocessor), valves and flow meters, the system 900 can serve as a hydroelectric generator or engine, depending on the application. In the vessel, the working fluid is an incompressible fluid, such as water, salt water, or antifreeze, which is returned continuously, as shown by the conduit 918 in FIG. 12*a*. Such a compact size of UHPL is named as the Recirculating Hydropower Engines (RHE). In an exemplary embodiment, a head space pressure of 200 psi (13.6 atm, 1,380 kPa) is equivalent to an underwater depth of 141 m (460 feet). No fluids escape from the system because the fluids used are recycles during power generation.

FIG. 13*a* is an aerial view of an exemplary underwater hydropower plant in a bay (UHPB) 1000. An existing bay, inlet or cove 1002 surrounded by land 1004 is engineered to generate a dry basin 1002 after the concrete barrier 1006 separates the bay from the ocean 1008. Then, the water in the bay 1002 is transferred to the ocean 1008 revealing the lower basin 1002 at the depth of the ocean across the barrier. The basin 1002 is prepared for the foundation to erect power plants 1010 including a plurality of the PGU 10 in FIG. 2a. The short penstock 1012 is provided for water intake from the ocean 1008 at an underwater ocean depth for power generation by the plant 1010. The conduit 1014 is prepared for the water discharge from the plant 1010 at the same depth of water intake from the ocean 1008. Alternatively, the barrier could be erected on dry shorelines first, then, the soils on the land are excavated to prepare a deep basin for the hydropower plants. Underwater hydropower plants on shorelines (UHPS), offer an advantage when unfavorable geographic conditions are present for preparation of the UHPB.

Figure 13B:
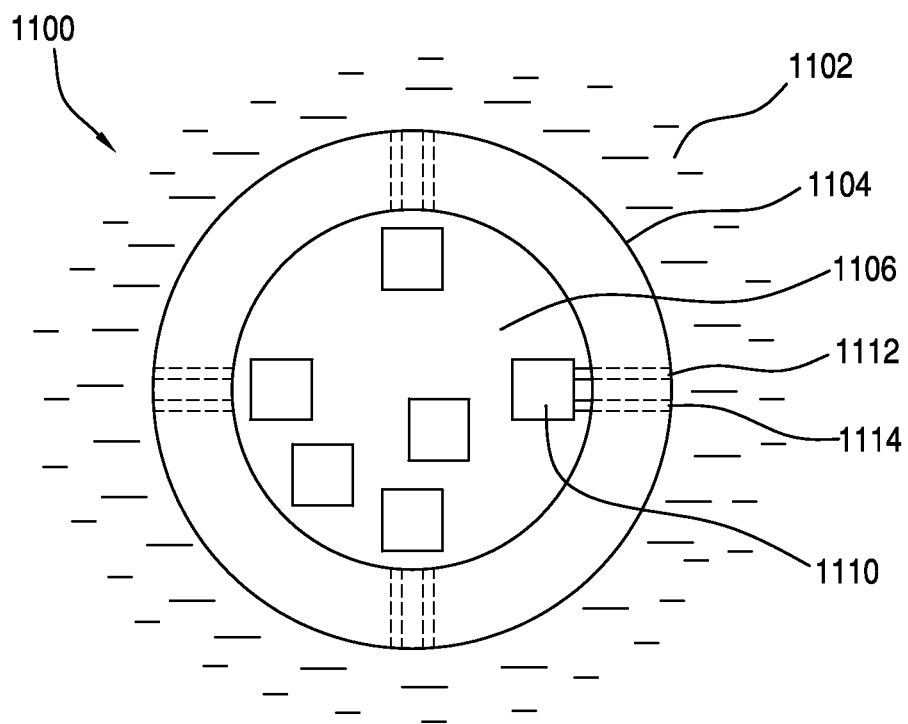
FIG. 13b is a top aerial view of an artificial island for renewable energy (AIRE) according to an exemplary embodiment.

FIG. 13b is an aerial view of an exemplary embodiment of an artificial island for renewable energy (AIRE) 1100. The AIRE is an island formed in an ocean 1102, although an island can be formed in another body of water (e.g., bay, river etc.). While the AIRE 1100 is shown having a circular shape formed by the concrete barrier 1104 that protects the AIRE 1100 from the impact forces of ocean waves, currents and wind, an AIRE can have any shape, such as rectangular or polygonal. The base of an internal space 1106 of the AIRE 1100 supports a plurality of the power plants 1110 after being engineered for the preparation of a foundation. The short penstocks 1112 are provided for water intake from an underwater ocean depth for power generation by the plant 1110. The conduits 1114 are prepared for the water discharge from the plants 1110 at the same depth of water intake from the ocean 1102.

Figure 13C:
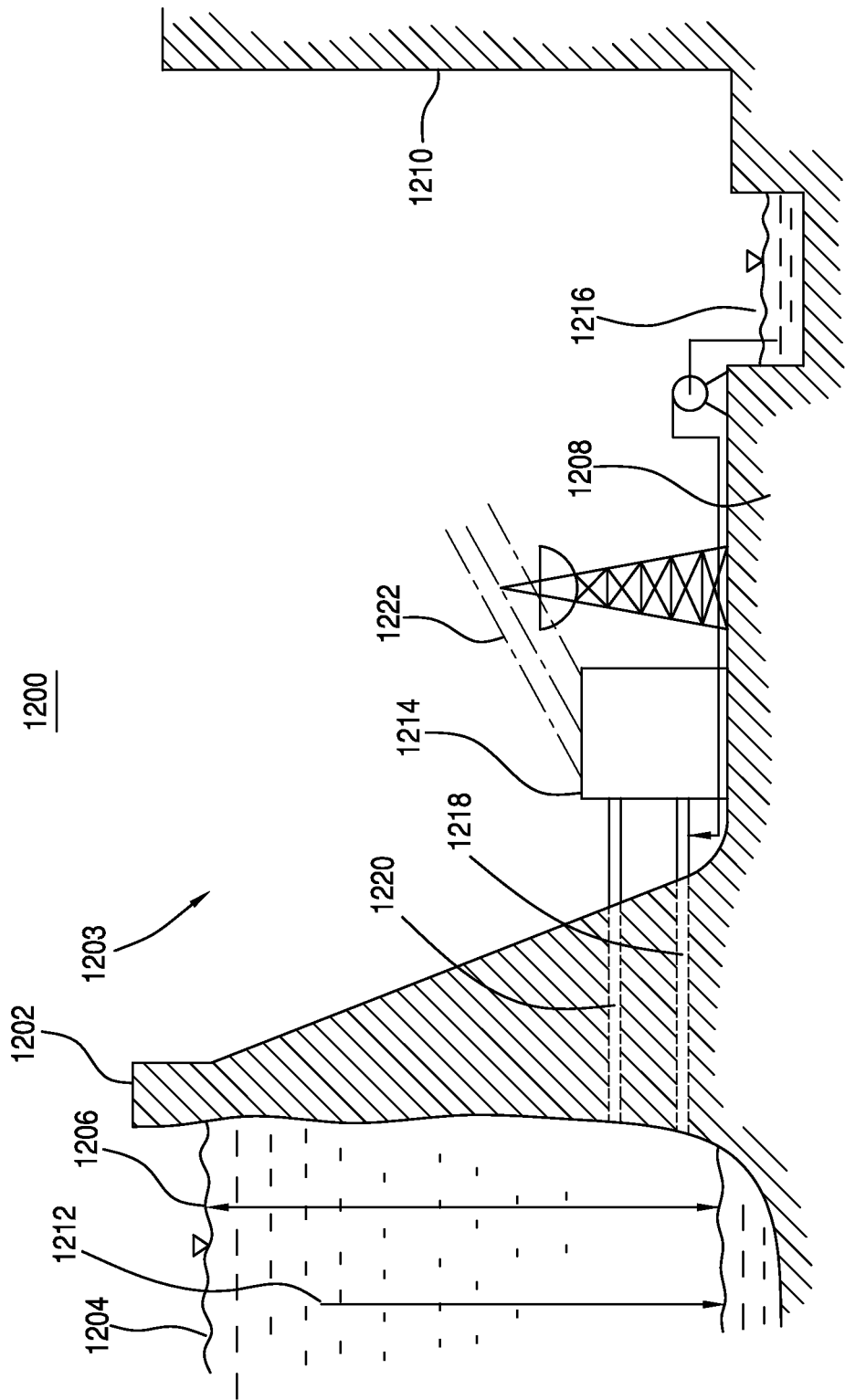
FIG. 13c is a side view of the concrete barrier separating UHPB, UHPS and ARE from ocean according to an exemplary embodiment.

FIG. 13c is a side view of an exemplary plant 1200 including a concrete barrier 1202, which can be the concrete barrier 1006 in FIG. 13a or the concrete barrier 1104 in FIG. 13b. The concrete barrier 1202 separates the plant the 1200 and basin 1203 from the ocean 1204 having a depth 1206. In the basin 1203, foundation 1208 and surrounding walls 1210 are formed with high strength, reinforced concrete to strengthen the soft sea floor 1212 to support a plurality of the UHPOA 1214 of the UHPB-type, the UHPS-type, or the AIRE-type. A pond 1216 stores the runoff water in the basin 1202, and the water is transferred to the ocean 1204 via a discharge line 1218. The conduit 1220 is a short penstock for water intake to generate the power in the plant 1214 employing the CVHR technology. The power is distributed to a local grid by the power line 1222.

Figure 14A:
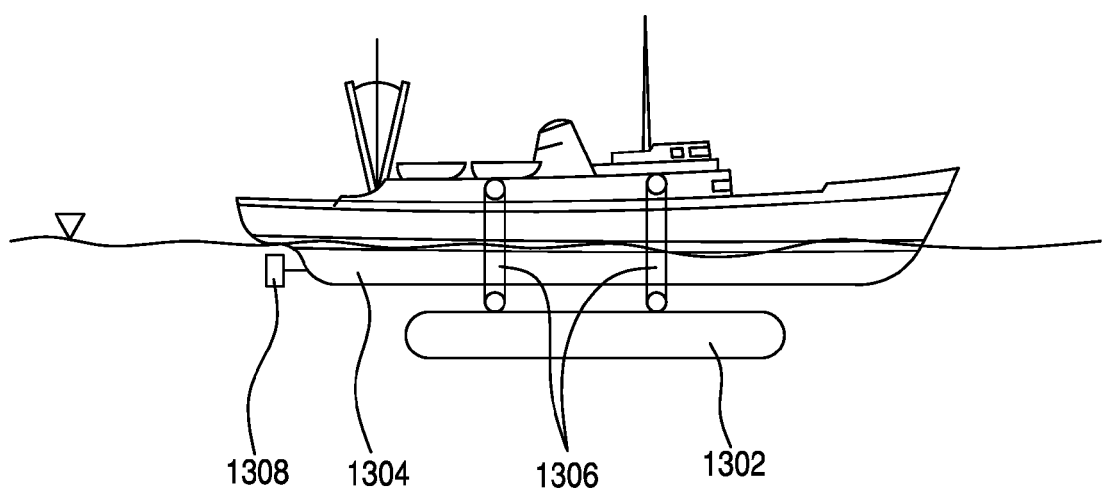
FIG. 14a is a side view diagram of a modular underwater generator (MUG) attached under a ship according to an exemplary embodiment.

FIG. 14a depicts a side view of a modular underwater generator (MUG) 1302 provided under a ship 1304 according to an exemplary embodiment. The MUG 1302 is supported by the metal braces 1306 attached to the ship 1304. A marine propeller 1308 at the rear of the ship 1304 is powered by the electricity generated by the MUG 1302. Air supply and withdrawal to maintain atmospheric pressure in the MUG 1302 and electric cables to transmit the electric power generated can be provided through flexible metal pipes in the braces 1306. The MUG 1302 could also be provided underneath of a submarine, cargo ship, carrier, oil tank or any type of marine and naval vessels for propulsion by electricity. The MUG 1302 can be capable of generating power as long as the MUG 1302 remains underwater whether the vessel is in operation or not. For this reason, the electric power when vessels are not operational could be employed for hydrogen production, which can be stored and used later for other purposes.

Figure 14B:
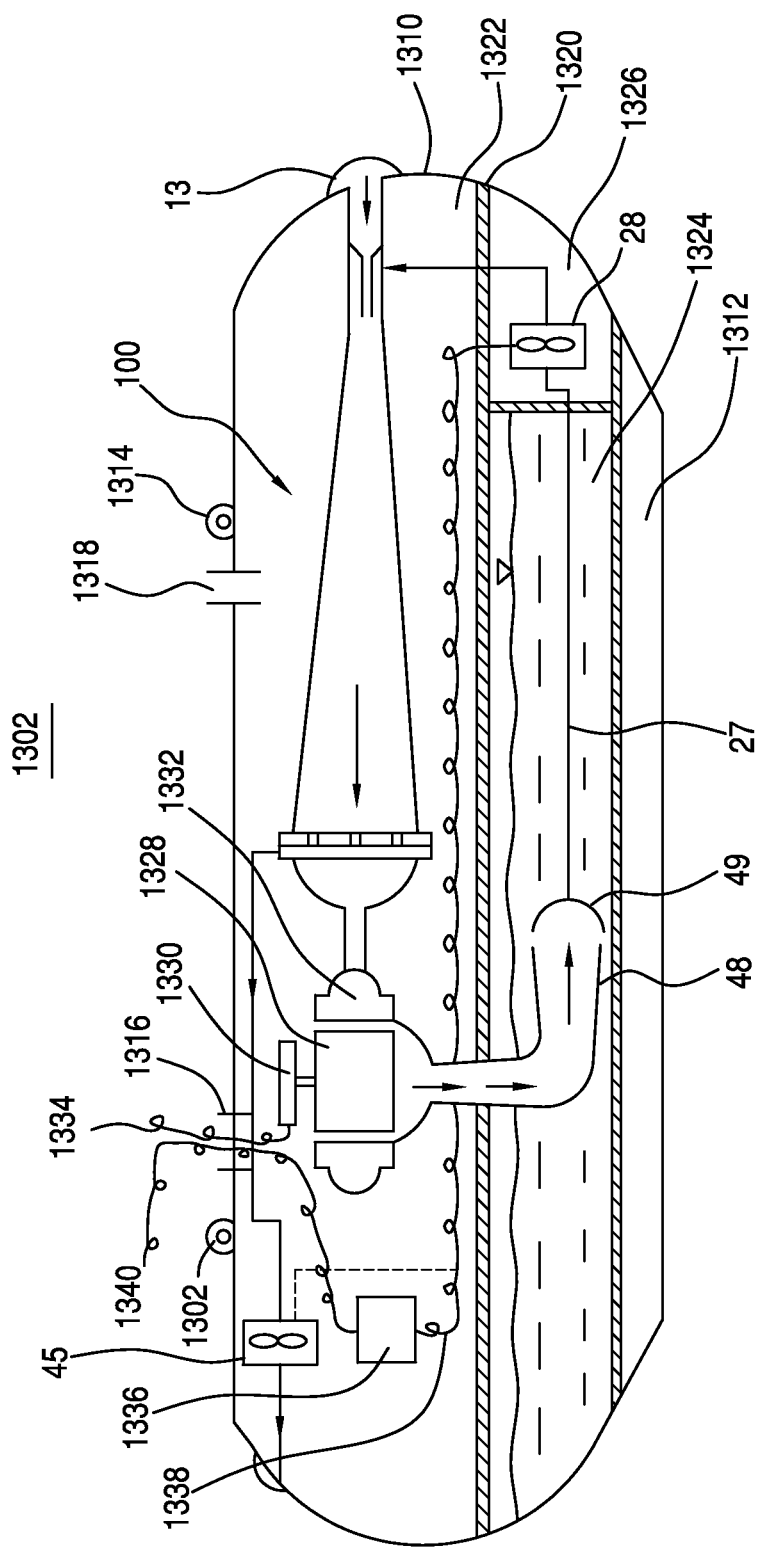

FIG. 14b depicts a schematic side view of the MUG 1302 shown in FIG. 14a. The MUG 1302 includes a hull 1310, which can have a shape for reducing hydrodynamic resistance. A ballast chamber 1312 is attached to the bottom of the hull 1310 to adjust buoyancy of the hull. The top of the MUG 1302 is provided with support rings 1314 to securely hold the hull 1310 to a mother ship (i.e., ship 1304 in FIG. 14a). Opening 1316 and 1318 along the top of the hull 1310 serve to supply air to and from the MUG 1302 and provide passageways for the electric cable between the mother ship and the MUG.

The hull 1310 is divided into two levels by a divider 1320, the upper level 1322 and the lower level which is further separated into a water reservoir 1324 and the mechanical compartment 1326 containing the recirculation pump 28. The pump 28 delivers the fluid discharged from the draft tube 48 of a radial Francis turbine 1328, through the half-moon shaped receiver 49 to the TS of CVHR I 100. Details of the system of CVHR I 100 are shown in FIGS. 3a to 3d and in FIG. 7. The upper level 1322 supports the system of CVHR I 100, the Francis reaction turbine 1328, and a generator 1330, and the discharge pump 45. The hydro-turbine 1328 could be one of the two types: a reaction turbine or impulse Pelton wheel, depending on the available energy head. This embodiment utilizes Francis reaction turbine 1328 because the depth at which ship 1304 in FIG. 14a floats, is much shallower than, for example, a submarine. The fishrack 13 filters any live fish and underwater debris attempting to enter to the MUG. The water stream travels through the CVT of the CVHR I 100 and enters the system of the spiral case, the guide vane assembly and the governor 1332 surrounding the turbine to maintain and control a uniform velocity around the turbine circumference. The power generated is transmitted to the ship through the cable 1334. The transformer 1336 supplies the power to the two pumps 29 and 45 through the cables 1338, 1340.

Alternatively, the MUG 1302 can be modified to include a pressure vessel (not shown) in front of the MUG 1302 shown in FIG. 14b. The vessel is pressurized to increase the total energy head. The water from the vessel (not shown) feeds to the CVT 100 for power generation and the water discharged from the turbine 1328 is fed to the CVT 100 by pump 28.

Figure 14C:
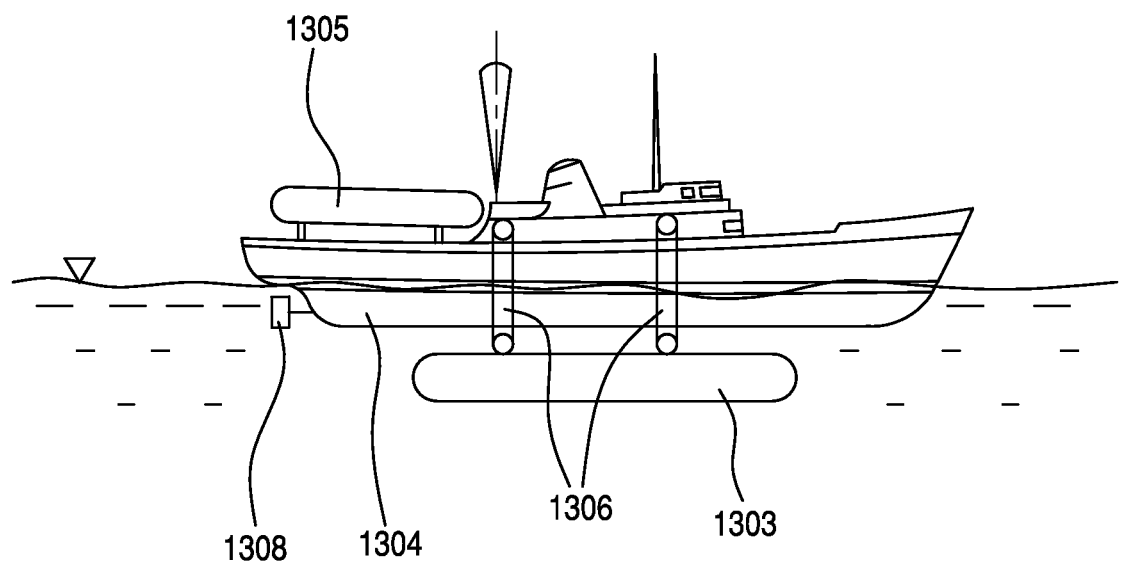
FIG. 14c is a side view diagram of a MUG attached under a ship according to another exemplary embodiment.
Figure 14D:
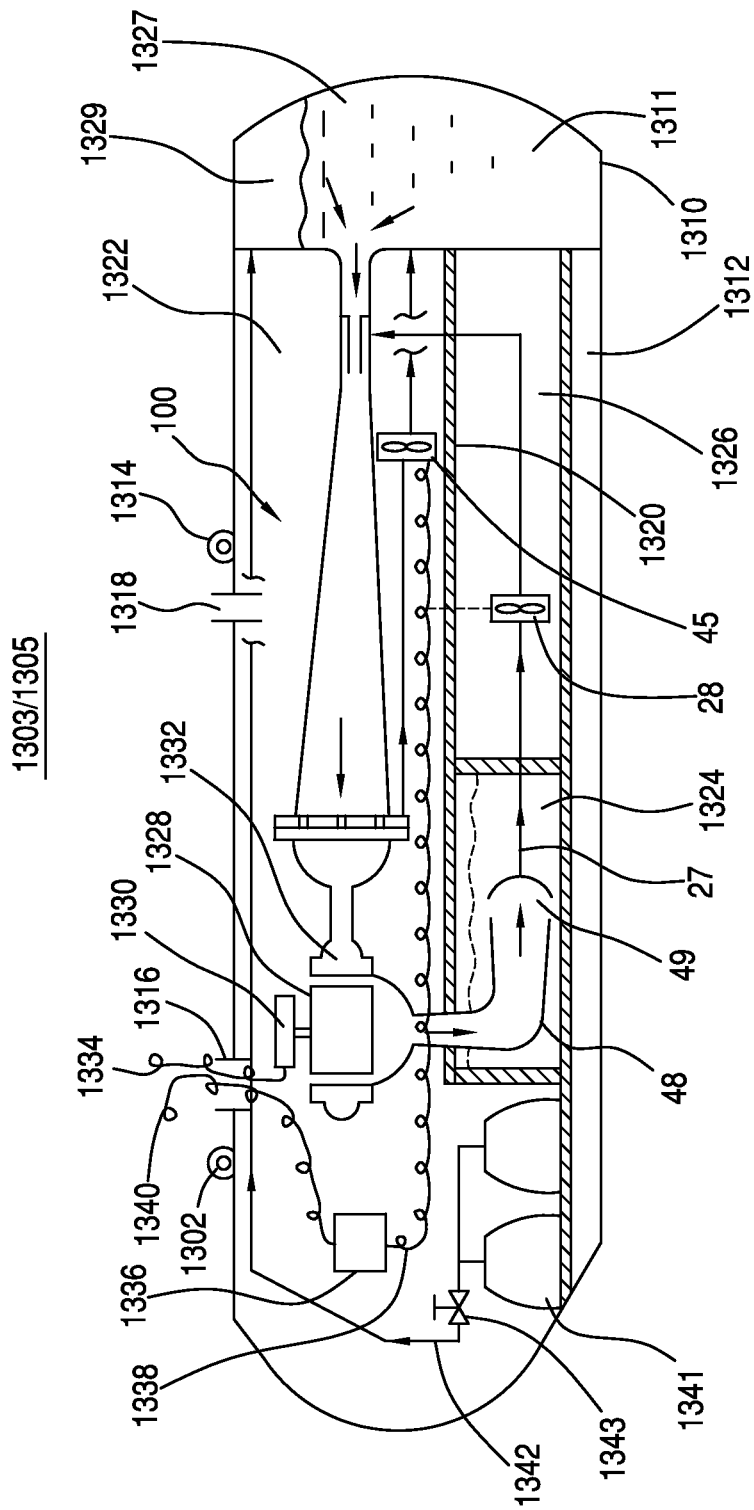
FIG. 14d is a side view diagram showing details of the exemplary MUG shown in FIG. 14c.

FIG. 14c depicts a side view of a modular underwater generator (MUG) 1303 provided under a ship 1304 according to an exemplary embodiment, and FIG. 14d shows a side view schematic diagram of the MUG 1303 shown in FIG. 14c. Elements having the same numbers as in FIGS. 14a and 14b are described above. The embodiment shown in FIGS. 14c and 14d addresses MUG implementations in which power generation not be capable or practical because of insufficient head pressure.

A ship floats because of buoyancy governed by Archimedes' principles, resulting a limited water depth of displacement. Most of commercial ships, except submarines, carry less than 15 m (50 feet) of standard load line marks. At such a depth, a MUG as shown by FIG. 14a may not receive the benefit of underwater potential energy for power generation. However, one remedy for addressing this deficiency is to install a pressure vessel 1311 in front of the MUG as shown in FIG. 14d. The pressure vessel 1311 filled with water 1327 or another working fluid and its head space 1329 is charged with a compressed gas such as nitrogen or air to increase the potential energy head. The compressed gas is stored in tanks 1341 and is in fluid communication with the pressure vessel 1311 via conduit 1342 and valve 1343.

With the compressed gas compensating and/or supplying sufficient head pressure, a MUG 1303 can be installed under the ship 1305 and/or a MUG 1305 can be installed on the ship 1305 for power generation. The water 1327 in the pressure vessel, for instance, can be charged with 16,300 kP (220 psi) nitrogen gas, which provides a pressure head equivalent to a seawater depth of 152 m (500 feet). Other benefits with such a system include the MUG 1305 producing hydrogen gas when the ship 1304 is not operational, which can be stored and used later for other purpose.

While only certain features of this invention have been illustrated and described herein, many modifications and changes will occur to those skilled in the art. It is therefore, to be understood the appended claims are intended to cover all such modifications and changes within the true spirit of the invention.

Glossary

AIRE Artificial islands for renewable energy, a type UHPOA.

$\beta_R$ Recirculation ratio, the ratio of recirculation flow to the primary flow.

BSUHP Bottom supported underwater hydropower plant
One of the underwater hydropower plants (UHP) which settles on seabed generating hydroelectric power by a plurality of the PGU.

CC Connecting conduit, see CVT.

CVHR Cho Venturi Hydraulic Ram includes three parts: a CVT, a pump and a controller with flow measuring devices and valves. Four exemplary types are: CVHR I, CVHR II, CVHR III, and CVHR IV.

CVT Cho Venturi Tube is an augmented redesign of the venturi tube.
Four exemplary types of CVT listed are CVT I, CVT II, CVT III, CVT IV. In each CVT there are six sections, listing in the order of arrangement: (1) an upstream conduit (UC), (2) a throat section (TS), (3) a connecting conduit (CC), (4) a diverging section (DS), (5) an end of the DS (EDS), and (6) a second converging section (SCS).

DS Diverging section, see CVT.

FB Flow box is a square-box or a circularly shaped open ring in reinforced concrete or metal with a depth of 3 to 6 feet and is disposed on the external wall covering fences which protect fishracks on PFD and FDS.

FDS Flow discharge station.

Head Energy head, H.
The term is derived from an energy equation given by, $$H = P/\gamma + v^2/2g + z$$

where, the first term is the pressure head, the second term velocity head, and the third term the elevation head. Although each term expresses in the unit of length in feet or meters, it represents the energy level.

HP Hydrogen plant.

HVDC High voltage direct current.

$L_{DS}$ Length of the Diverging section.

$L_T$ Total length of CVT, excluding the diameter of a turbine.

MUG Modular underwater generator. A MUG is a portable modular unit for underwater electric power generation. The MUG can be either for a stationary power supply or motor, or for attachment to marine or naval vessels to power these vessels. Other applications can include powering remotely operated vehicles and autonomous underwater vehicles for propulsion. A MUG usually carries one or a few PGUs.

NOAA National Oceanic and Atmospheric Administration, a U.S. agency incorporating the National Weather Service.

OS Onshore substation. OS is an electrical substation on shore. The OS receives HVDC via marine power cables from either UES or OSD and the power received is inverted back to AC for a local electric grid.

OSD Offshore substation on the deck. The OSD receives the power from the UES of the UHP to distribute the electricity for in-plant consumption and to transmit the electric power to OS.

$P_D$ The pressure at the end of the DS in CVT.

$P_H$ Hydraulic power generation in MW.

PFD Pressurized flow distributors. In one embodiment a PFD is a metallic, cylindrical conduit with a diameter in less than 20 feet (6 meters) and a length of about 50 feet or less. The device receives the pressurized water from underwater ocean and delivers each CVT connected.

PGU Power generation units. Each unit can include a PFD, a FDS, the system of CVHR, a hydraulic turbine, an electrical generator, a power transformer, coolers, etc.

PWC Pressurized water column. Structure including a volume of working fluid. The head space contains pressurized gas such as nitrogen, air or any inert gas. Individual gases should have a low solubility in the liquid phase of the working fluid. The liquid phase can include a pure or a mixture of liquid including, for example, water, salted water, antifreeze, or any other liquid, preferably of environmentally friendly medium.

ROC Remote operation center (ROC) on the deck, equipped with SCADA system.

$Q_{SVN}$ Volume flow rate in cubic meters per second in the conduit leading to the system of a spear valve and a nozzle.

SC Spiral case or scroll case, see CVT.

SCS Second converging section, see CVT.

SFUHP Semi-submersible floating underwater hydropower plant. SFUHP is one of the UHP which floats due to buoyancy of the structure in water and generates hydroelectric power by a plurality of the PGU.

SVN System of a spear valve and a nozzle, see CVT.

TS Throat section, see CVT.

UC Upstream conduit, see CVT.

UES Underwater electric substation. UES is an electric substation assembled in UHP. At UES the electric power received from each PGU is converted to HVDC to deliver to OS and part of the electric power is delivered to OSD for in-house consumption.

UHP Underwater hydropower plants and UHP is a general term like UHPOA. The structures of the UHP are watertight enclosure. Three types of the UHP are the BSUHP, the semi-submersible floating UHP (SFUHP) and the modular underwater generator (MUG).

UHPB Underwater hydropower plant on a bay, a type of UHPOA.

UHPL Underwater hydropower plant on land, a type of UHPOA.

UHPOA Underwater hydropower plant opened to air. UHPOA is a general term like UHP and includes four types: UHPL, UHPB, UHPS and ARE. While UHP requires complete submergence in water to utilize underwater potential energy for power generation, the UHPOA does not need to be watertight and submerged, but it still utilizes underwater potential energy for power generation.

UHPS Underwater hydropower plant on shorelines, a type of UHPOA.

USC Underwater service chamber.

UHSC Underwater hydrogen storage chamber.

$V_C$ Flow velocity in the connecting conduit.

VIV Vortex-induced vibration is a structural motion of vibration in vertical direction resulted from underwater currents moving around a column.

What is claimed is:

1. A fluid expulsion system for expelling working fluid from a hydropower plant having an energy conversion device, comprising:
a venturi tube including an upstream conduit positioned to receive a primary flow of working fluid having a hydrostatic head pressure at a depth in a body of working fluid, a throat section, a diverging section positioned downstream of said throat section, and a converging section leading to a conduit configured to deliver a working fluid stream including a portion of the primary flow of working fluid for hydropower generation;

a recirculation circuit fluidly connected to said throat section to recirculate a recirculation flow of working fluid from downstream of said energy conversion device to the throat section to combine with said primary flow to form a combined flow; and a discharge passage positioned at an end portion of the diverging section to receive a portion of said combined flow from said diverging section to form a discharge flow for expulsion to the body of working fluid.

2. The system of claim 1, further comprising a controller, recirculating pump, a valve and a flow measuring device positioned along said recirculation circuit, wherein said pump, valve and flow measuring device communicate with the controller to set and maintain a selected level of said recirculation flow.

3. The system of claim 2, further comprising a reservoir positioned in said recirculation circuit to collect working fluid from the energy conversion device.

4. The system of claim 3, further comprising a flow receiver immersed in the reservoir, wherein said flow receiver includes a draft tube and a flow collector having a half-moon shape to reduce the resistance of a working fluid stream from said draft tube.

5. The system of claim 1, wherein said recirculation flow is driven by a reduced pressure created in the throat section by the primary flow and by pumping power provided to said recirculation flow by a pump.

6. The system of claim 2, wherein a volume flow ratio of the recirculation to the primary flow in the throat and a velocity of the combined flow at the end of the diverging section determine pressure development at the end of the diverging section, the length of the venturi tube, and strength of kinetic energy of the working fluid stream for power generation by said energy conversion device.

7. The system of claim 1, wherein the diverging section of the venturi tube further comprises a flow stabilizer including multi-layers of top-off cones elevated at a center of said diverging section to reduce loss of flow energy resulting from flow separation and formation of eddies.

8. The system of claim 1, wherein an angle of convergence of the converging section is less than 23 degrees and an angle of divergence of the diverging section is less than ten degrees.

9. The system of claim 1, further comprising a controller, a first discharge valve and flow measuring device pair positioned along said discharge passage, and a second discharge valve and flow measuring device pair on the upstream conduit, wherein said controller adjusts flow of working fluid in said first and second pairs to maintain the flows of working and discharge fluid in the conduits substantially the same.

10. The system of claim 1, wherein two routes for the discharge flow include a direct discharge to underwater via a flow discharge station and a discharge to openings on a periphery of an inlet section of a power flow distributor.

11. The system of claim 10, wherein selection of one of said two routes is instructed by a microprocessor communicating with a first flow measuring device and a control valve pair on the discharge passage leading to said flow discharge station, and with a second flow measuring device and a control valve pair disposed on a branched pipe from said discharge passage leading to said periphery of the pressurized flow distributor.

12. The system of claim 11, wherein the openings on said periphery of the inlet section allows recharging of the recirculation flow with the underwater high pressure.

13. The system of claim 12, further including ion exchange columns or membranes positioned in said recirculation circuit to reduce salt content of seawater used as the working fluid in said plant.

14. The system of claim 13, further including a filtration device positioned in said recirculation circuit to reduce the level of contaminated silty soils in the plant.

15. The system of claim 1, wherein said throat section is formed with a circular cross-section smaller than the upstream conduit, a diameter ratio of the upstream conduit to that of the throat is between 0.4 and 0.8.

16. The system of claim 15, wherein said diameter ratio of the upstream conduit to that of the throat is approximately 0.707.

17. The system of claim 1, wherein said venturi tube includes a pair of oval-shaped sheets positioned on opposite sides of the upstream conduit to form a pair of symmetrical "D" shaped sheets creating a flow passage between said pair of sheets for said primary flow.

18. The system of claim 17, wherein each of the symmetrical D-shaped sheets include a sloping tail section, and an angle of divergence of the sloping tail sections is less than about 10 degrees.

19. The system of claim 17, wherein said the D-shaped sheets include a plurality of circular openings on surfaces thereof to admit recirculation flow from the recirculation circuit into the primary flow.

20. The system of claim 19, wherein the combined area of the openings on both of the D-shaped sheets is about the same as the cross sectional area of a recirculation conduit of the recirculation circuit.

21. The system of claim 1, wherein said venturi tube has a teardrop-shaped conical distributor positioned in the center of the upstream conduit.

22. The system of claim 21, wherein the surface of said teardrop-shaped conical distributor has three sections: an anterior blunt forehead without any openings, an anterior of a flat mid-section without any openings and a posterior of the flat mid-section with openings, and a reducing tail section after the posterior of the flat mid-section with openings.

23. The system of claim 22, wherein the total area of said openings on said teardrop-shape is about the same as the cross sectional area of a recirculation conduit of the recirculation circuit.

24. The system of claim 1, wherein said venturi tube has a spherically shaped chamber bridging a jet nozzle at the end of the upstream conduit to a funnel-type flow receiver facing said nozzle to produce vacuum pressure in said chamber by impinging action of a jet stream from said jet nozzle.

25. The system of claim 24, wherein said spherically shaped chamber facilitates sucking in working fluid from the recirculation circuit, assisted by a pump, to a funnel-type flow receiver leading to a connecting conduit joining the diverging section thereafter.

26. The system of claim 1, wherein said fluid expulsion system and the energy conversion device are housed in a watertight plant structure submerged underwater such that said working fluid is water, said plant structure further comprising towers and columns supporting a deck above a surface of the water, at least one of said towers and columns containing at least one of freight and passenger elevators, supply of human breathing air to keep atmospheric pressure required for turbines in the plant, electric power cables, utility pipes and communication cables.

27. The system of claim 1, wherein the venturi tube includes an outlet downstream of the converging section to which the conduit is connected, and the discharge passage is fluidly connected to the venturi tube prior to the outlet to form the discharge flow including the combined flow for expulsion to the body of working fluid.

28. A hydroelectric power plant including plural power generation units, each said unit comprising the system of claim 1, a flow box, a pressurized flow distributor, a flow discharge station, a recirculation pump, a hydraulic turbine, and an electric generator.

29. The hydroelectric power plant of claim 28, wherein said flow discharge station is a cylindrical or rectangular box, extending from an external plant wall to inside of the plant, and a plurality of exit streams from the venturi tubes are connected to the discharge station.

30. The hydroelectric power plant of claim 28, wherein said pressurized flow distributor is a cylindrical conduit extending horizontally from external walls of the plant to the inside of said plant and includes a plurality of circular openings each connected to one of the plural venturi tubes.

31. An underwater hydropower plant positioned at a depth in a body of working fluid, comprising:
an energy conversion device adapted to convert kinetic energy of working fluid into mechanical energy;
a venturi tube including an inlet positioned to receive a primary flow of working fluid having a hydrostatic head pressure at a depth in the body of working fluid, a throat section downstream of the inlet, and an outlet positioned downstream of the throat section and configured to direct working fluid including a portion of the primary flow of working fluid to the energy conversion device;
a recirculation circuit fluidly connected to said venturi tube to recirculate working fluid from downstream of the energy conversion device to combine with said primary flow in the throat section to form a combined flow; and
a discharge passage fluidly connected to said venturi tube to receive a portion of said combined flow to form a discharge flow for expulsion to the body of working fluid.

32. The underwater hydropower plant of claim 31, wherein the discharge passage is fluidly connected to the venturi tube prior to the outlet to form the discharge flow including the combined flow for expulsion to the body of working fluid.

33. A method of expelling fluid from a hydropower plant having an energy conversion device, comprising:
flowing a primary flow of working fluid in an upstream conduit of a venturi tube, said primary flow of working fluid having a hydrostatic head pressure in a pressurized column, and said venturi tube including a throat section, a diverging section positioned downstream of said throat section, and an outlet downstream of the diverging section configured to direct working fluid including a portion of the primary flow of working fluid to the energy conversion device;
recirculating working fluid from downstream of said energy conversion device to the throat section to combine with said primary flow in the throat section to form a combined flow; and
discharging a portion of said combined flow from said diverging section, or from downstream of said diverging section, prior to said energy conversion device to create a discharge flow; and
expelling at least a portion of said discharge flow to the a body of working fluid including the pressurized column.

34. The method of claim 33, wherein said working fluid includes at least one of water, salted water or antifreeze.

35. The method of claim 33, wherein the head pressure at a depth in a body of fluid is in part provided by a compressed gas in a head space of a chamber including the working fluid.

36. The method of claim 35, wherein the compressed gas is one of nitrogen, air, and an inert gas with a low solubility in said working fluid.

37. The method of expelling fluid from a hydropower plant of claim 33, wherein the discharge passage is fluidly connected to the venturi tube prior to the outlet to form the discharge flow including the combined flow for expulsion to the body of working fluid.

38. A system for expelling working fluid from a power plant for a hydropower engine or generator, comprising:
a pressure vessel containing a working fluid and a pressurized gas in a head space of the vessel, said pressure vessel including an outlet and an inlet;
a venturi tube including an upstream conduit positioned to receive a primary flow of the pressurized working fluid in said pressure vessel, a throat section, a diverging section positioned downstream of said throat section, and a converging section leading to a conduit for delivery of said working fluid for hydropower generation wherein an end portion of the diverging section of the venturi tube is fluidly connected with the inlet of the pressure vessel;
a recirculation circuit fluidly connected to said throat section to recirculate working fluid discharged from an energy conversion device to the throat section such that the discharged working fluid combines with said primary flow to form a combined flow; and
a discharge passage positioned to receive a portion of said combined flow from said diverging section to form a discharge flow for expulsion to said pressure vessel.

39. The system of claim 38, wherein said working fluid includes at least one of water, salted water or antifreeze.

40. The system of claim 38, wherein the compressed gas in the head space is one of nitrogen, air, and an inert gas with a low solubility in said working fluid.

41. The system of claim 38, wherein said hydropower engine is powered with hydroelectricity generated by said energy conversion device.

42. The system of claim 41, wherein said energy conversion device comprises a system including a hydraulic turbine and an electric generator, and said hydropower engine is powered by a combination of hydroelectricity and torque developed by said hydraulic turbine.

* * * * *